US008819887B2

(12) United States Patent
Belanger et al.

(10) Patent No.: US 8,819,887 B2
(45) Date of Patent: Sep. 2, 2014

(54) ILLUMINATED HUB FOR A VEHICLE WASH COMPONENT

(71) Applicants: Michael J. Belanger, Northville, MI (US); Barry S. Turner, Novi, MI (US); Thomas E Weyandt, Northville, MI (US)

(72) Inventors: Michael J. Belanger, Northville, MI (US); Barry S. Turner, Novi, MI (US); Thomas E Weyandt, Northville, MI (US)

(73) Assignee: Belanger, Inc., Northville, MI (US)

( * ) Notice: Subject to any disclaimer, the term of this patent is extended or adjusted under 35 U.S.C. 154(b) by 43 days.

(21) Appl. No.: 13/668,093

(22) Filed: Nov. 2, 2012

(65) Prior Publication Data

US 2013/0185876 A1    Jul. 25, 2013

Related U.S. Application Data

(60) Provisional application No. 61/554,559, filed on Nov. 2, 2011, provisional application No. 61/556,893, filed on Nov. 8, 2011, provisional application No. 61/642,831, filed on May 4, 2012.

(51) Int. Cl.
*B60S 3/06* (2006.01)
*A46B 7/10* (2006.01)

(52) U.S. Cl.
USPC ............... 15/230.16; 15/4; 15/53.2; 15/97.3; 15/179; 15/182

(58) Field of Classification Search
CPC ............ B60S 3/06; B60S 3/063; B60S 3/066; A46B 7/10; A46B 13/00; A46B 13/02; A46B 13/001; A46B 13/003; A46B 13/005; A46B 15/00; A46B 2200/3046
USPC .............. 15/4, 53.1–5.3, 97.3, 179, 181–183, 15/230, 230.16, 230.19, DIG. 2
See application file for complete search history.

(56) References Cited

U.S. PATENT DOCUMENTS

| | | | | |
|---|---|---|---|---|
| 5,784,748 A * | 7/1998 | Belanger et al. | ........... | 15/230.14 |
| 2004/0200024 A1 * | 10/2004 | Yamin | ........................ | 15/230.16 |
| 2006/0207047 A1 * | 9/2006 | Weyandt | ..................... | 15/230.13 |
| 2009/0250993 A1 * | 10/2009 | Vivyan et al. | .................... | 300/21 |
| 2011/0138558 A1 * | 6/2011 | Favaqgrossa | ................... | 15/160 |

* cited by examiner

*Primary Examiner* — Mark Spisich
(74) *Attorney, Agent, or Firm* — Dickinson Wright, PLLC

(57) ABSTRACT

A component for a vehicle wash system includes a frame and a hub portion that is rotatably connected to the frame. The hub portion has an inner surface, an outer surface and an axis of rotation. The hub portion includes a plurality of media elements secured thereto and arranged in a plurality of spaced apart rows that extend in a direction along the axis of rotation. The hub portion includes at least one translucent portion disposed on its outer surface. The translucent portion is disposed between a pair of adjacent rows of the plurality of spaced apart rows. The hub portion includes at least one illumination element for illuminating the at least one translucent portion such that said illuminated translucent portion is configured to be seen while the said hub portion rotates.

35 Claims, 19 Drawing Sheets

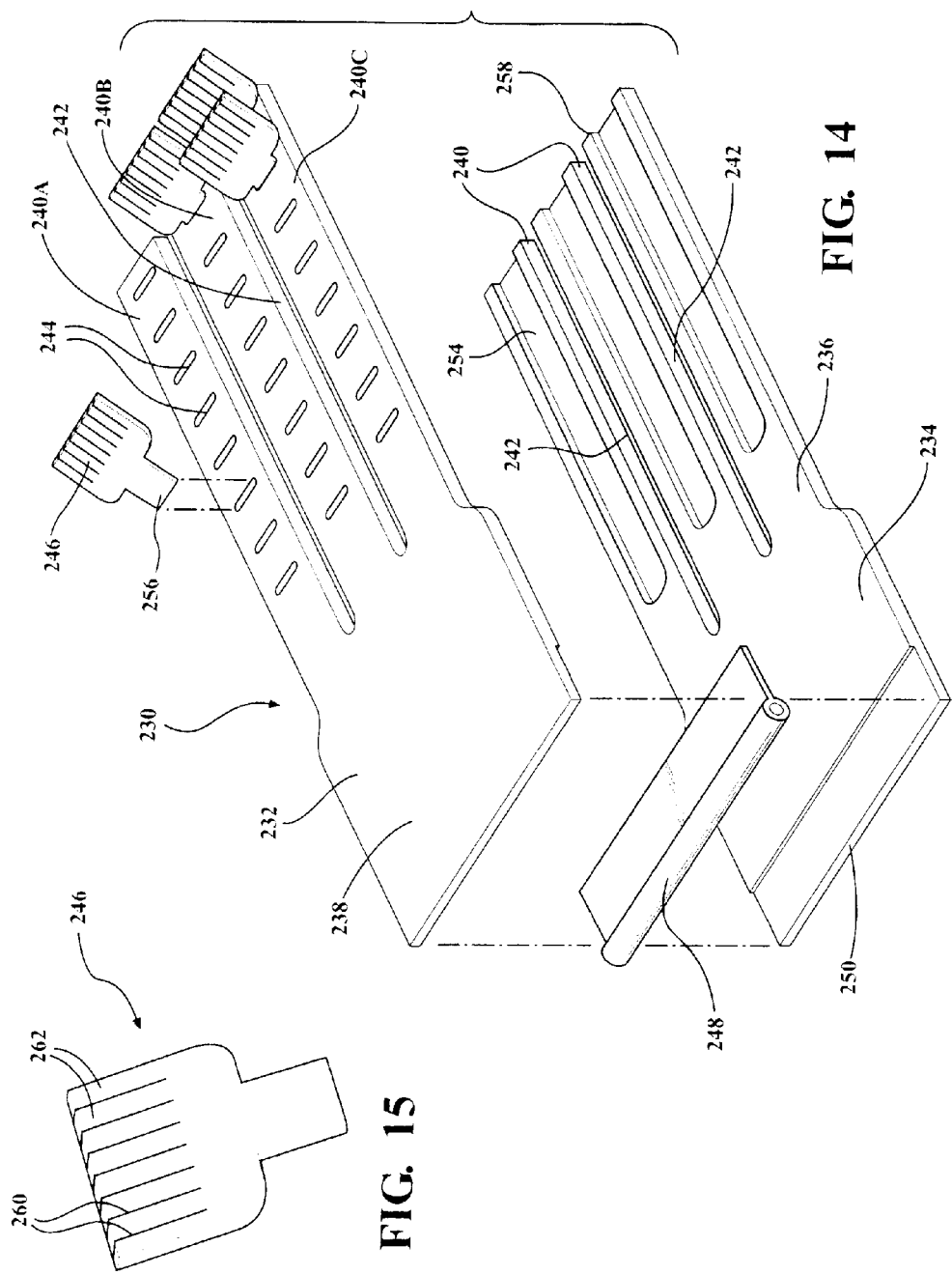

US 8,819,887 B2

ILLUMINATED HUB FOR A VEHICLE WASH COMPONENT

CROSS-REFERENCE TO RELATED APPLICATIONS

The present application claims priority to U.S. Provisional Patent Application Ser. No. 61/554,559, entitled "Car Wash Implement and Splayable Foam Plastic Element for Use in Constructing Same", which was filed on Nov. 2, 2011; U.S. Provisional Patent Application Ser. No. 61/556,893, entitled "Injection Molded Foamed Polymeric Car Wash Media", which was filed on Nov. 8, 2011; and U.S. Provisional Patent Application Ser. No. 61/642,831, entitled "Top Brush", which was filed on May 4, 2012, the disclosures of which are hereby incorporated by reference as though set forth fully herein. The present application is related to Applicant's concurrently filed U.S. patent application Ser. No. 13/668,058, entitled "An Improved Vehicle Wash Component", filed Nov. 2, 2012; U.S. patent application Ser. No. 13/668,029, entitled "An Improved Media Element for a Vehicle Wash Component", filed Nov. 2, 2012; and U.S. patent application Ser. No. 13/668,121, entitled "A Hub for a Vehicle Wash Component Having an Arcuate Pattern of Media Elements", filed Nov. 2, 2012, the disclosures of which are hereby expressly incorporated by reference as though set forth fully herein.

FIELD OF THE DISCLOSURE

The present invention relates generally to a vehicle wash component for use in cleaning a vehicle exterior in a vehicle wash facility. More specifically, the present invention relates to a rotary brush having an illuminated hub to provide enhanced aesthetics.

BACKGROUND

In an effort to boost revenues, vehicle washes offer extra services on top of their base wash packages. These services are marketed using lights and signs. In many washes, lights are used in an otherwise dimly lit vehicle wash facility to enhance the customer's experience. Indeed, many wash owners make an attempt to give their wash a "carnival feel" and use lighted arches and signs as a way to advertise extra services like tire shine, sealer wax, triple foam and to brighten the vehicle wash facility. As is also known, consumers are familiar with rotating signs that are employed by many businesses to get their attention as well as to advertise. However, with current vehicle wash facilities, lighted signs and the like can only do so much to brighten the environment within the facility as most facilities are relatively dark and intimidating, which can cause consumers to avoid frequenting the facility.

These problems are largely created by the fact that rotary car wash brushes utilize a cylindrical central hub design, which is densely populated with a plurality of washing elements, such that the hub itself is not easily visible once the brush is assembled. This can give the assembled brush a large, imposing appearance some customers find objectionable. This densely populated hub design also blocks a great deal of light, so that as the brushes approach a vehicle to wash it, the vehicle occupants may experience a significant darkening of the vehicle interior that many find unpleasant and undesirable. This method of construction also causes many rotary car wash brushes to share a largely similar, utilitarian appearance that makes it correspondingly difficult for wash operators to provide a distinctive or memorable service offering to their customers. Combine this darkness with windshields and side windows that are covered with soapy water, and visibility within current vehicle wash facilities is very low.

It would thus be desirable to provide a vehicle wash component that addresses these issues.

SUMMARY OF THE INVENTION

It is therefore an advantage of the present disclosure to provide a vehicle wash component that yields improved aesthetics within the vehicle wash facility.

It is another advantage of the present disclosure to provide a vehicle wash component that enhances a customer's experience during the wash process.

It is a further another advantage of the present disclosure to provide a vehicle wash component that helps create brand recognition.

It is a still another advantage of the present disclosure to provide a vehicle wash component that brightens the environment within a vehicle wash facility.

It is yet another advantage of the present disclosure to provide a vehicle wash component that yields enhance brightness and aesthetics when the component is at rest.

In accordance with the above and the other advantages, a vehicle wash component is provided which includes a frame and a hub portion that is rotatably connected to the frame. The hub portion has an inner surface, an outer surface and an axis of rotation. The hub portion includes a plurality of media elements secured thereto and arranged in a plurality of spaced apart rows that extend in a direction along the axis of rotation. The hub portion includes at least one translucent portion disposed on its outer surface. The translucent portion is disposed between a pair of adjacent rows of the plurality of spaced apart rows. The hub portion includes at least one illumination element for illuminating the at least one translucent portion such that the illuminated translucent portion is configured to be seen while the said hub portion rotates.

Other advantages of the present invention will be readily appreciated, as the same becomes better understood by reference to the following detailed description when considered in connection with the accompanying drawings.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 4b is a top view of the top brush of FIG. 4a;

FIG. 4c is a side view of the top brush of FIG. 4a;

FIG. 5b is a top view of the brush assembly of FIG. 5a;

FIG. 5c is a side view of the brush assembly of FIG. 5a;

FIG. 14 is an exploded view of a media element for a vehicle wash component in accordance with an aspect of the present disclosure;

FIG. 15 is a perspective view of a treatment head of the media element of FIG. 14;

DETAILED DESCRIPTION OF THE INVENTION

Figure 1A:
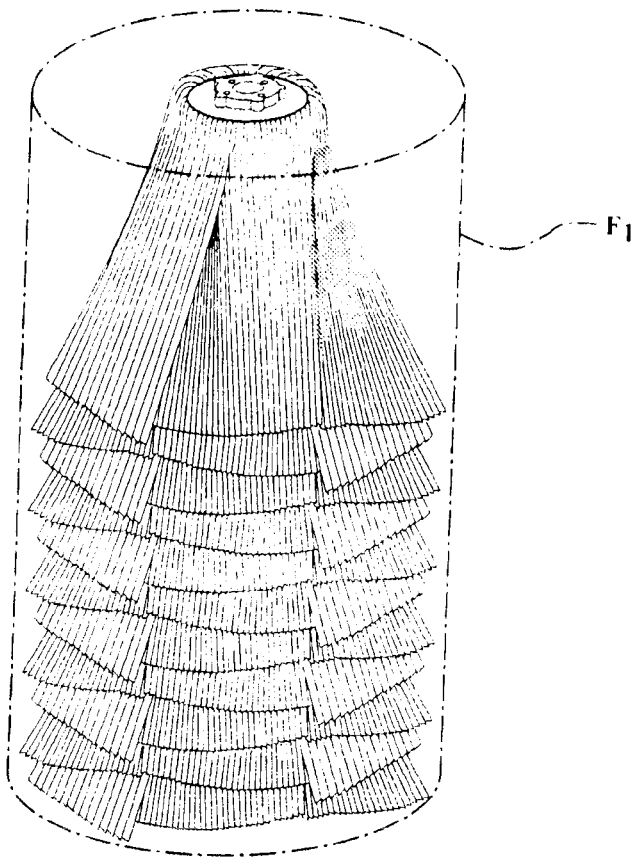
FIG. 1a is a perspective view of a vehicle wash component at rest in accordance with the prior art.
Figure 1B:
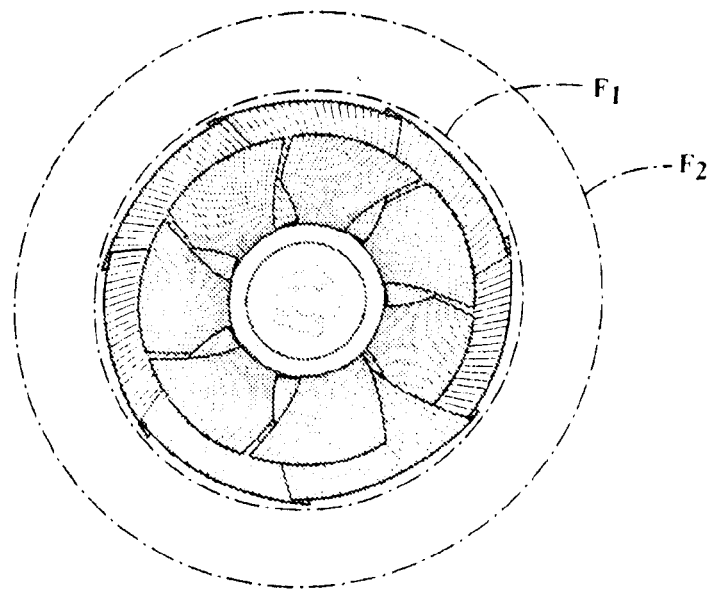
FIG. 1b is a top view of the prior art vehicle wash component of FIG. 1a at rest.

A typical brush utilized in existing vehicle wash facilities is exemplarily illustrated in FIGS. 1a and 1b. As shown, when these rotary brushes are at rest, the attached media elements hang downwardly such that their outer ends are generally disposed adjacent a lower end of the rotary brush. At rest, the component thus has a small effective contact area or working diameter, as defined by the outermost boundary or footprint of the elements. This footprint is generally designated as $F_1$ in FIGS. 1a and 1b.

The useful working diameter of these rotary brushes is only increased to a sufficient size where the media elements extend generally outwardly in a perpendicular fashion from the hub and into contact with a vehicle, when the brush is rotated at high speeds. At high rotational speeds, the media elements extend outwardly due to centrifugal force to a useful working diameter or footprint, as generally designated as $F_2$ in FIGS. 2a and 2b. When the brush stops rotating or the speed of rotation is reduced considerably, the centrifugal force is insufficient to support the media elements and they will hang or droop, as shown in FIGS. 1a and 1b.

Figure 2A:
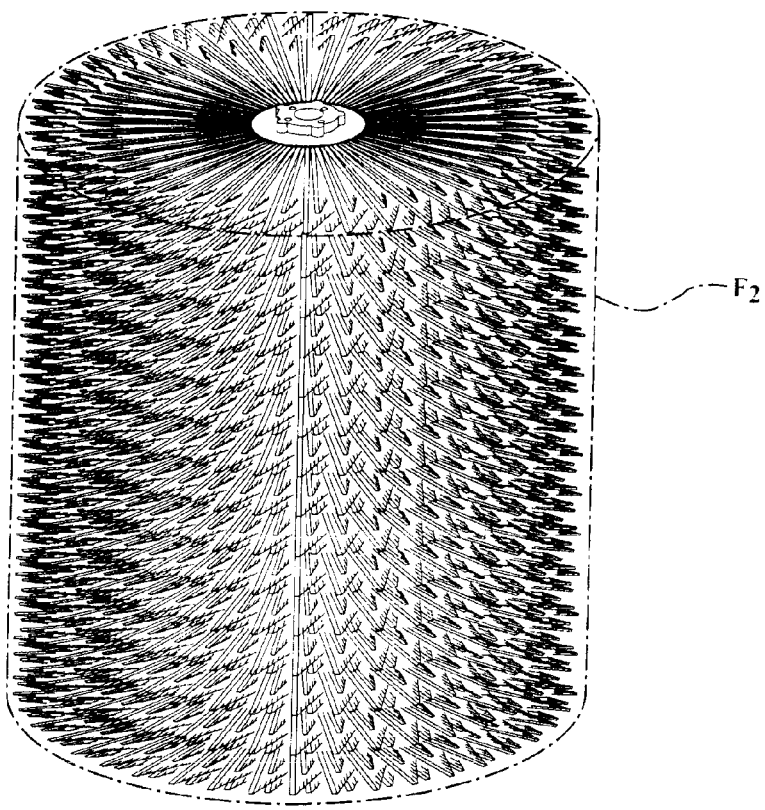
FIG. 2a is a perspective view of a vehicle wash component rotating at high RPMs in accordance with the prior art.
Figure 2B:
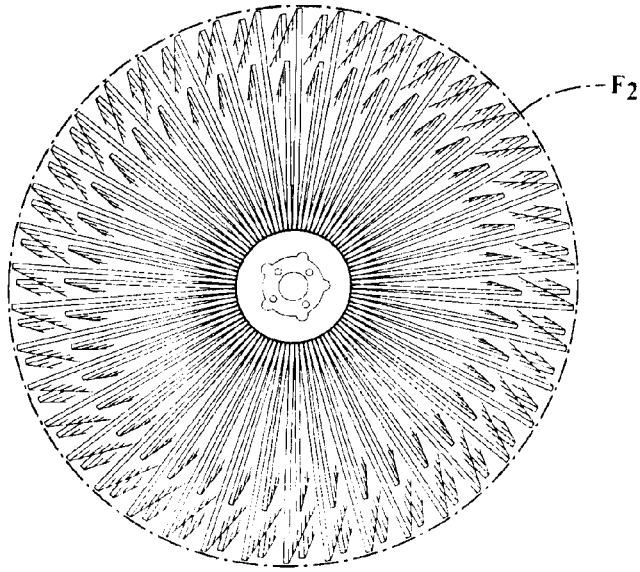
FIG. 2b is a top view of the prior art vehicle wash component of FIG. 2a rotating at high RPMs.

It is thus common practice to rotate vehicle wash brushes at higher speeds when washing a vehicle. These speeds are typically in the range of 60 RPM to 110 RPM and higher with much of this rotational speed being needed to extend the flexible washing elements to their working length as shown in FIGS. 2a and 2b. At these high rotational speeds, the otherwise limp washing elements can reach the surface of a vehicle to be washed. These high rotational speeds also help maintain a safe working distance between the vehicle surface and the rigid central hub of the rotary car wash brush. Unfortunately, as the rotational speeds of these vehicle wash brushes are increased to provide a necessary working diameter, other problems are created.

Figure 3:
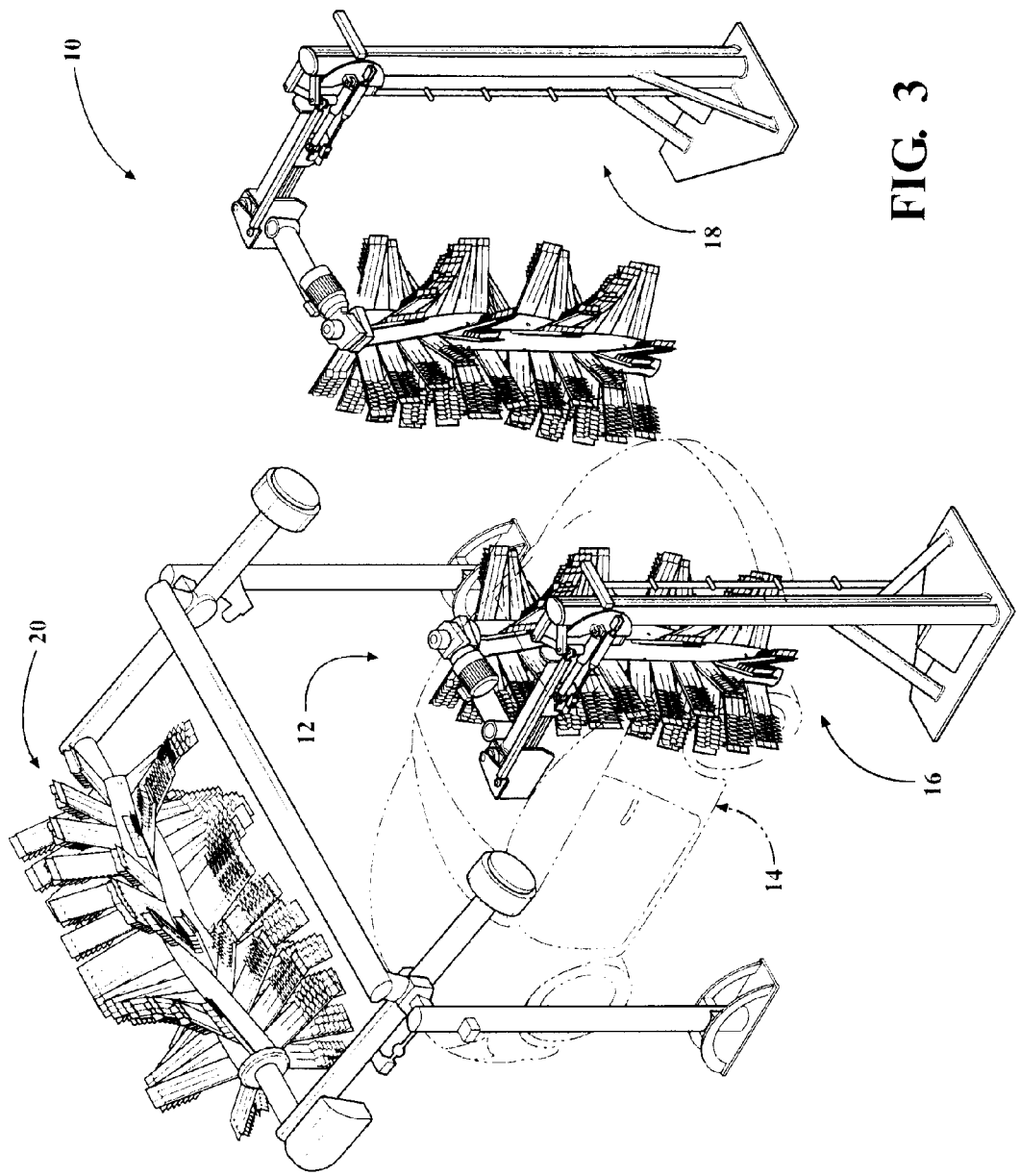
FIG. 3 is a perspective view of portion of a vehicle wash facility in accordance with the present disclosure.

The present disclosure generally relates to an improved vehicle wash component for use in a vehicle wash facility. Turning now to the Figures, FIG. 3 schematically illustrates a portion of a vehicle wash facility 10 in accordance with an aspect of the disclosure. The vehicle wash facility 10 includes a vehicle wash area 12, where a vehicle 14 passes for treatment, such as results from a conveyer. It will be appreciated that the vehicle wash facility may employ other mechanism for moving the vehicle 14 therethrough, including a vehicle under its own power. While FIG. 3 illustrates a tunnel vehicle wash facility, in accordance with another aspect, the vehicle wash may alternatively be of a roll-over type. The disclosed vehicle wash facility may be used to clean cars and trucks, but it could also be employed to clean other types of vehicles. As shown, the vehicle wash facility 10 may include a pair of opposing side brushes 16, 18, which are located on either side of the vehicle wash area 12 to clean or treat the sides of a vehicle. The vehicle wash facility 10 may also include a top brush 20 for cleaning or treating the top of the vehicle. The vehicle wash facility 10 may obviously include other components for treating a vehicle, such as rinse components and drying components. Additionally, more, less or different brushes may also be employed.

Figure 4A:
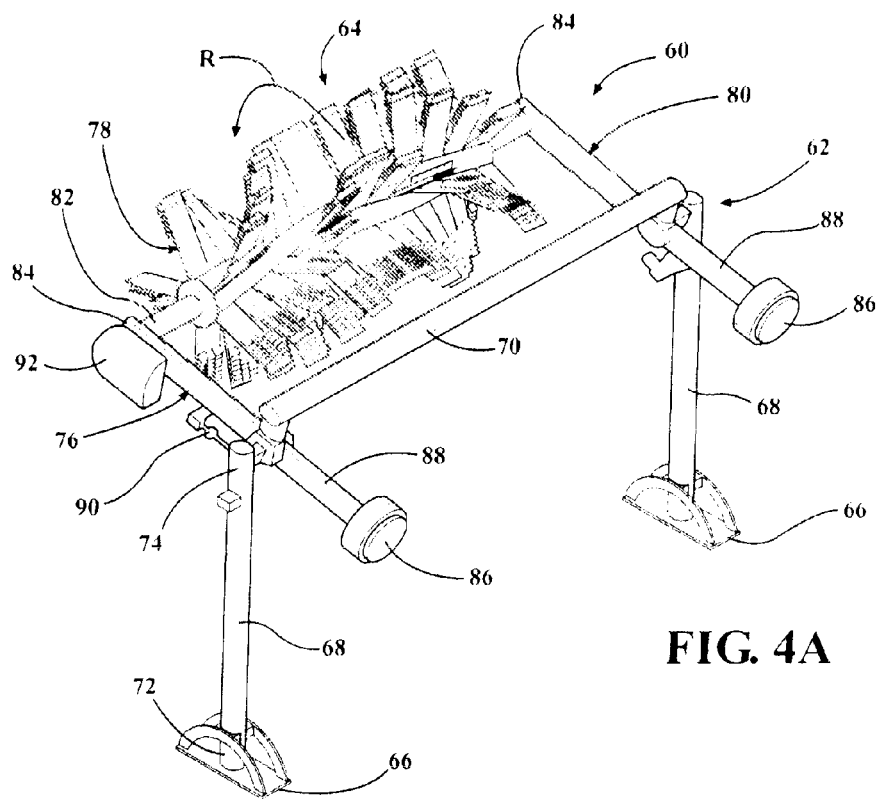
FIG. 4a is a perspective view of a top brush in accordance with another aspect of the present disclosure.
Figure 4B:
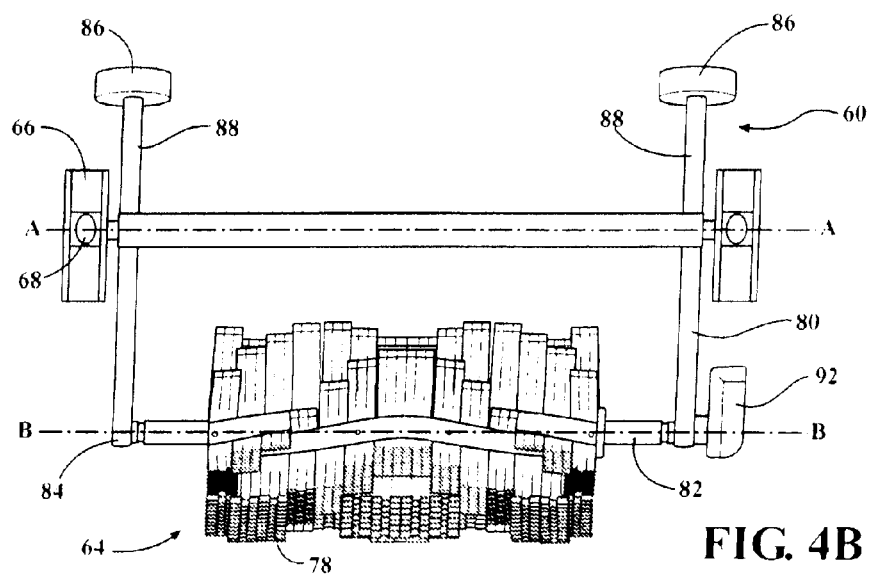
Figure 4C:
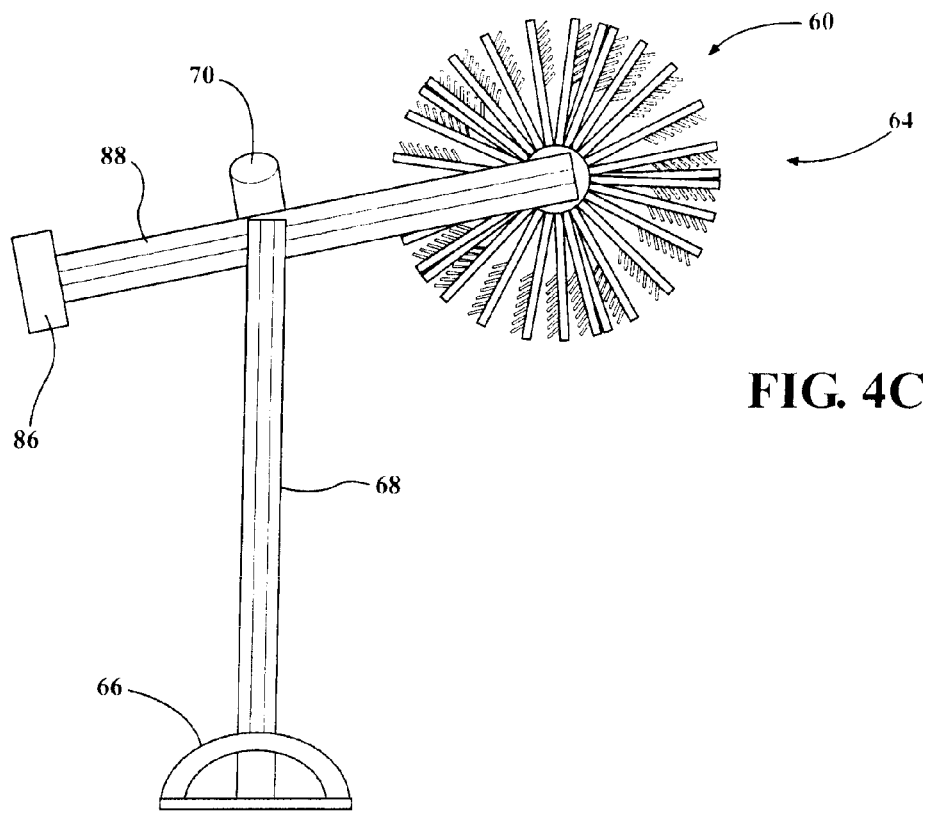

FIGS. 4a through 4c illustrate a vehicle wash component 60 in accordance with an aspect of the disclosure. According to this aspect, the vehicle wash component 60 is a top brush for contacting the top surfaces of a vehicle and consists of a frame 62 and a brush portion 64. The top brush 60 can be particularly suited for use in vehicle wash applications such that while it is being rotated by a suitable power source, such as a motor, it can be brought into contact with the exterior surface of a vehicle to perform a scrubbing or cleaning function. While these Figures illustrate a top brush, it will be appreciated that other types of brushes, such as side brushes may also be employed. The top brush can obviously perform other functions besides cleaning.

The frame 62 can consist of multiple components, including a pair of floor mount portions 66, a pair of vertical supports 68, and a cross beam 70. In accordance with one aspect, the components of the frame 62 may be constructed of a metal material and could be powder-coated to resist against corrosion. The components of the frame 62 may also be constructed of a plastic or other suitable non-metal material. All or portions of the frame 62 could alternatively be formed as a single integral structure.

According to an aspect, the floor mount portions 66 may be mounted to a floor of a vehicle wash facility. The floor mount portions 66 may each be configured as a generally flat structure for engaging a flat surface, such as a floor of the vehicle wash facility. Alternatively, the floor mount portions 66 may be configured with generally flat bottoms. The vertical supports 68 of the frame 62 may extend generally upward from a respective floor mount portion 66 and can include a lower end 72 secured to the floor mount portion 66 and an upper end 74 disposed remotely from the floor mount portion 66. The vertical supports 68 are preferably spaced far enough apart to permit a vehicle to pass therebetween. In addition, the vertical supports 68 are preferably long enough to accept a cross beam 70 which is high enough off the floor of the wash facility to accommodate a vehicle passing therebeneath. As shown, the vertical supports 68 may be oriented generally perpendicular to the floor mount portions 66. However, it will be appreciated that the vertical supports 68 may extend at different angles from the floor mount portion 66. Also, the cross beam 70 may extend between and connect the upper ends 74 of the vertical supports 68.

According to an aspect, the brush portion 64 may include a u-shaped counterbalance frame 76 and a top brush assembly 78. The u-shaped frame 76 is preferably pivotally connected to the frame 62 and can include a pair of pivotal arm portions 80 and a cross-support 82 that extends between first ends 84 of the pivotal arm portions 80. Pursuant to a further aspect, a counterbalance weight 86 may be secured to the second ends 88 of each of the arm portions 80 to allow rotation of the arms about an axis A-A to raise and lower the top brush assembly 78 mounted on the cross-support 82 between the first ends 84 of the pivotal arm portions 80. The top brush assembly may be driven in rotation about an axis B-B in the direction of the arrow R. In operation, the top brush assembly 78 may be moved between a vehicle engaging position and a retracted position under computer control by cylinders 90, such as hydraulic or pneumatic cylinders, that extend between the pivotal arm portions 80 and the vertical supports 68. According to another aspect, the top brush assembly 78 may be moved in a variety of other suitable ways. In accordance with an aspect, a motor 92 is in communication with the top brush assembly 78 to cause rotation thereof at predetermined speeds in the direction R.

Figure 5B:
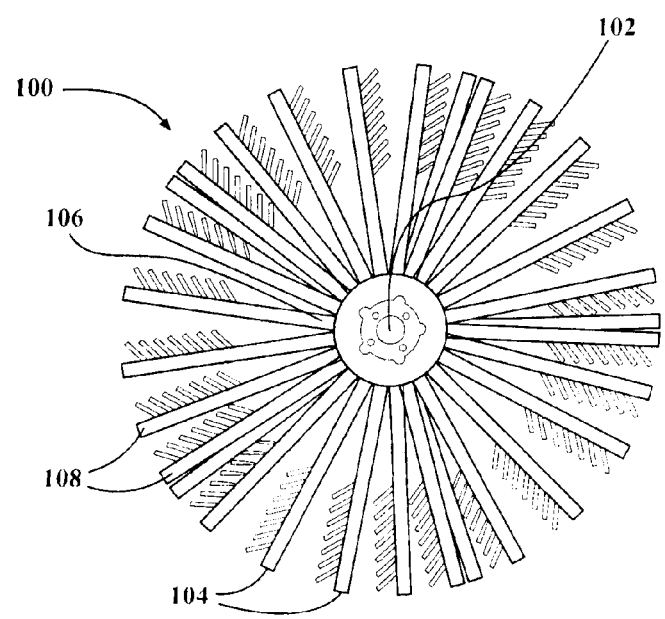
Figure 5A:
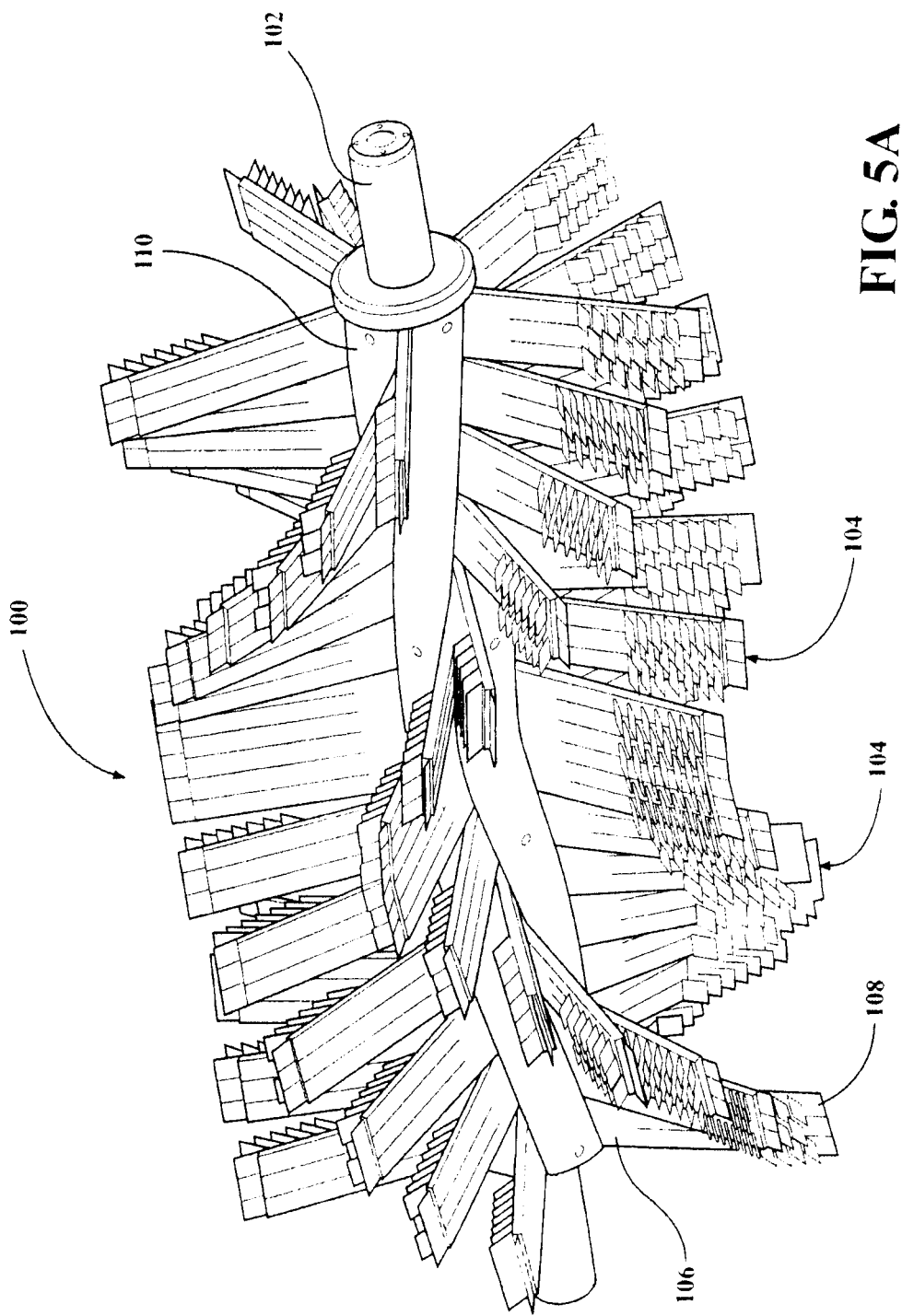
FIG. 5a is a perspective view of a brush assembly for a vehicle wash component in accordance with an aspect of the present disclosure.
Figure 5C:
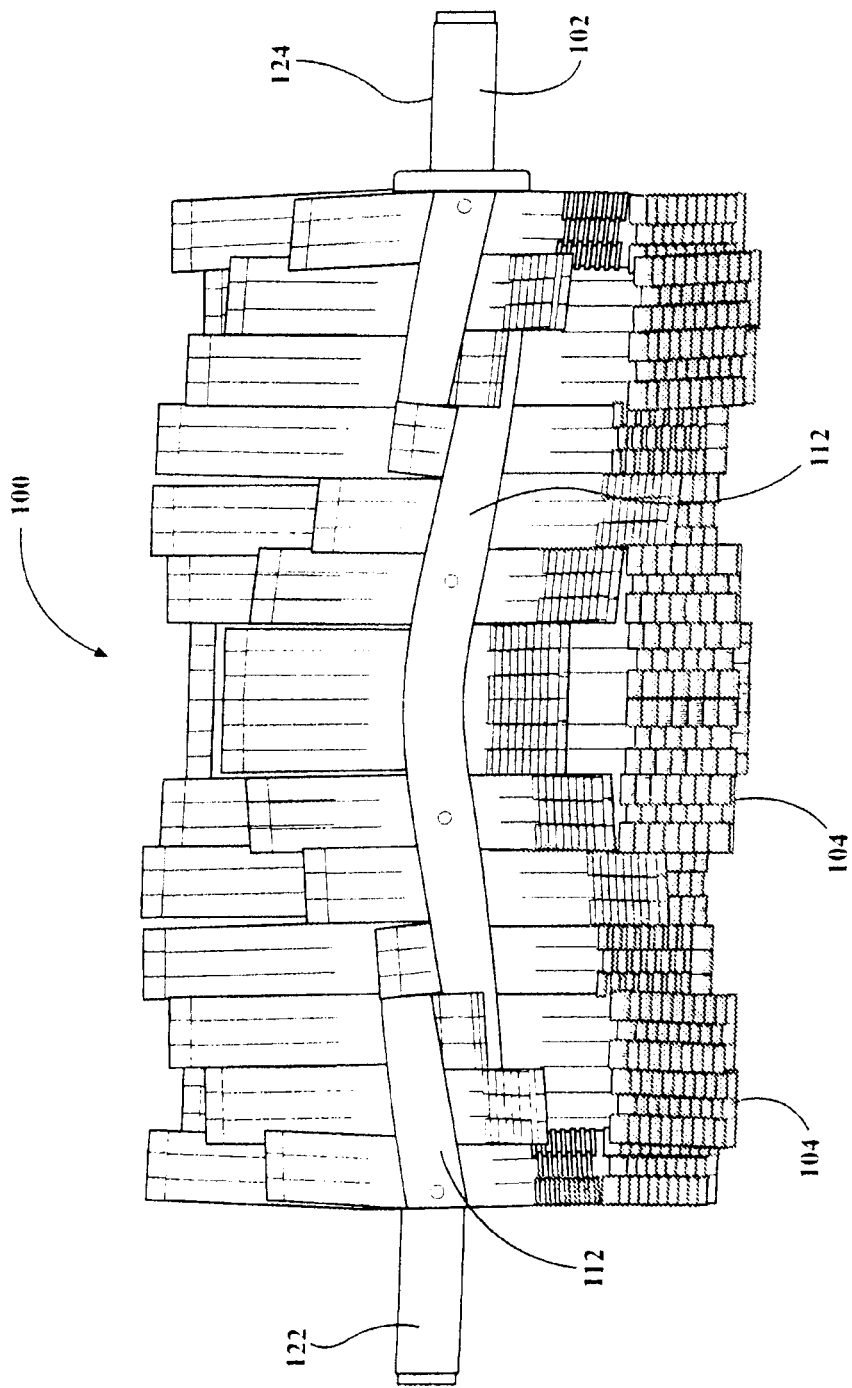

FIGS. 5a through 5c, illustrate a brush assembly 100 in accordance with an aspect of the present disclosure. As shown, the brush assembly 100 preferably has a generally cylindrical configuration. However, the brush assembly 100 may be shaped in a variety of different ways, such as a tapered or hourglass configuration. It will be appreciated that the brush assembly 100 and/or similar implements may be used not only in conveyer washers, but also in the so-called rollover washers where the vehicle is stationary and the brushes are mounted to a gantry or the like which can move back and forth relative to a vehicle. The brush assembly 100 may be used in connection with a side brush, a top brush or other rotating component.

As shown in the Figures, the brush assembly 100 may consist of a hub portion 102 and a plurality of media elements 104 extending circumferentially around and away from the hub portion 102. The media elements 104 have a first end 106 that may be secured to the hub portion 102 and a second end 108 located away from the hub portion 102. The first ends 106 of the media elements 104 may be secured to the hub portion 102 by way of media securement members, which are secured to the hub portion 102 in a variety of suitable ways.

Referring now to FIGS. 6 through 10, it can be seen that the media elements 104 are attached to hub portion 102, such that they are arranged in multiple spaced apart rows. Instead of rows, the media elements could also be disposed in columns. The rows of media elements 104 are spaced apart from one another around the exterior of the hub portion 102 such that portions of the hub portion are visible between the plurality of rows. According to an aspect, the media elements 104 are arranged so that their attachment points occupy only about 50 percent or less of the exterior surface of the hub portion 102. Since the hub portion 102 necessarily has a smaller diameter than the attached washing elements, and since the hub can be easily visible through the spaces between the attached washing elements, the rotary car wash brush so constructed has a much less imposing appearance than one of conventional construction, even if both brushes have the same effective overall washing diameter. It will be appreciated that the degree to which the attachment points cover the exterior surface can vary.

According to an aspect, the media elements 104 are secured such that they are oriented perpendicular to the axis of rotation of the hub portion 102 and the ground. Alternatively, the media elements 104 can be mounted to the hub portion 102 such that they are cocked at an angle with respect to ground.

Figure 6:
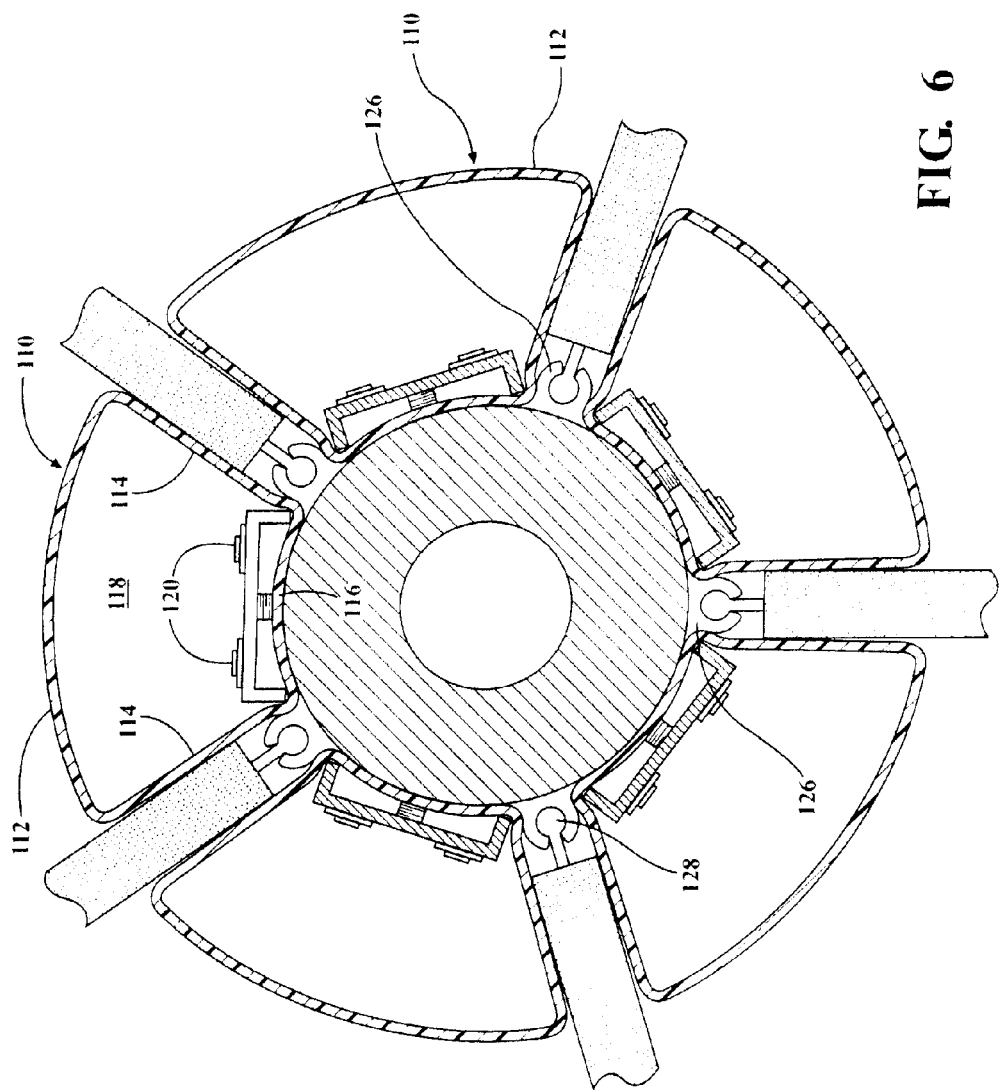
FIG. 6 is an enlarged sectional view of the area of the brush assembly within the circle labeled 6 in FIG. 5c.
Figure 7:
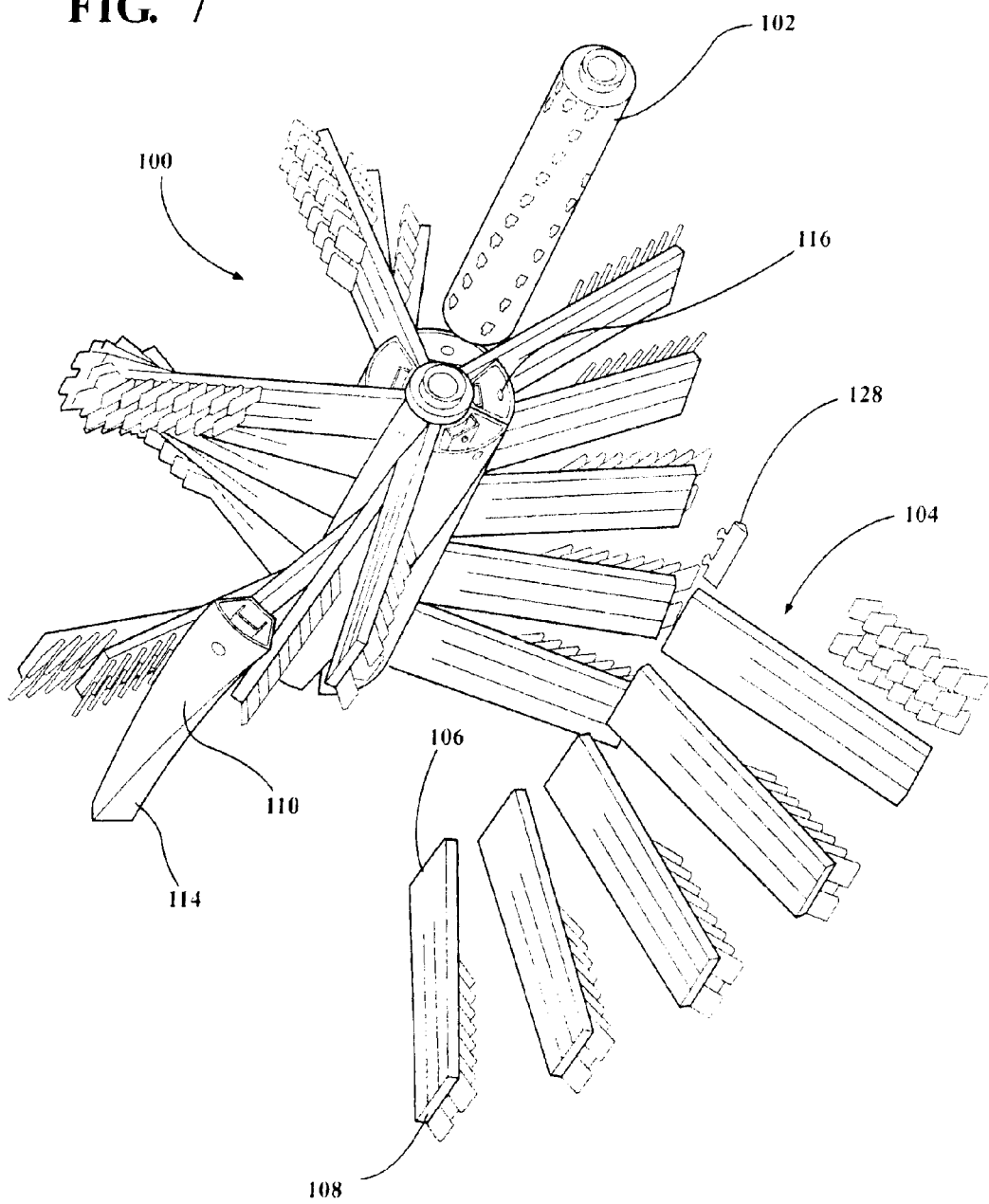
FIG. 7 is an exploded view of a brush assembly in accordance with another aspect of the present disclosure.

According to another aspect, a plurality of lens portions 110 can be disposed around the perimeter of the hub portion 102 between the rows of media elements. Preferably, the lens portions 110 are disposed between adjacent spaced apart rows of media elements. The lens portions 110 may be translucent and may be a molded extruded part formed of a suitable material, such as a polymer. As shown in FIGS. 6 and 7, the lens portions 110 may generally have a trapezoidal shape and can include an outer surface 112, and a pair of sidewalls 114, and a bottom surface 116 that collectively define a channel 118. In accordance with an aspect, the lens portions 110 are disposed between the rows of media elements with the bottom surface 116 being fastened to the hub portion 102, such as by screws. In accordance with an aspect, access holes may be provided in the bottom surface 116 to facilitate attachment of the lens portions 110 to the hub portion 102 along its length. It will be appreciated that the lens portions 110 can take on a variety of different configurations and sizes and can be secured to the hub portion 102 in a variety of ways. According to another aspect, the translucent lens can be an integral part of the hub or can be utilized to separate halves of the hub or other portions as desired.

Also, the substantial exposed hub area makes it possible to illuminate the hub with an internal or external lighting source. This can help mitigate the darkening effect of the vehicle interior experienced by vehicle occupants during the washing process. In accordance with another aspect, illumination elements 120 are mounted in the channels 118 of the lens portions 110 to illuminate the lens portions 110. The illumination elements 120 may be LED strips, consisting of individual LEDs that are connected through slip rings to a DC power source so as to illuminate the lens portions 110 during brush operation. It will be appreciated that other illumination elements 120 may also be utilized. Additionally, the illumination elements 120 may also be utilized to illuminate the lens portions 110 when the brush is at rest. Further, the illumination elements 120 can be disposed in a variety of other places.

The illuminated hub has an appearance that helps distinguish the wash location from competing sites that use rotary car wash brushes of conventional construction and non-illuminated hubs. In accordance with an aspect, pleasing aesthetic effects can be provided by illuminating the hub portion in one color or set of colors and employing media elements of other colors such that the appearance of the brushes in, for example, a conveyer wash is attractive and pleasing rather than intimidating and industrial. Also, the colors of the lights can be easily changed as can the colors of the media elements. Additionally, the illumination elements 120 can be configured to blink or have other effects to further enhance the aesthetically pleasing effect of the vehicle wash. Different color illumination elements can be employed at the same time.

According to an aspect, the rows of media elements 104 may be configured on the hub portion 102, such that they are parallel to one another. In accordance with another aspect, the rows of media elements 104 may be disposed in a non-linear path such as a spiral, helical or arcuate path. As shown, the rows of media elements may follow a curving path from one end 122 toward the center of the hub portion 102, and then reverse that path from the center to the far end 124. These arcuate rows ensure that media elements are contacting the vehicle surface at all times and assists in reducing operational noise. The non-linear rows work like a series of screw threads or an auger causing dirt to move from one media element to the next to actively remove dirt from the vehicle exterior. The arcuate arrays also eliminate gaps between the media elements, thereby eliminating any striping of clean and unclean areas of the vehicle.

By spacing the rows of media elements 104 apart from one another, gaps exist between the rows of media elements 104. The gaps can create a bouncing or lope effect on the side of the vehicle, which can cause more noise. The utilization of the arcuate shape for the rows of media elements 104 can reduce both bounce and noise. This is, in part, because the media elements 104 are disposed at an angle with respect to the vehicle exterior. This angle can also shed dirt downward toward the floor and provide a better cleaning of vehicle running boards and the top corners of vehicles where the roof meets the sides. The media elements 104 may also be arranged on the hub portion 102 in a variety of other patterns or orientations.

The hub portion 102 is preferably constructed of a rigid, strong material such as aluminum. In accordance with an aspect, the hub portion 102 preferably is adapted to be mounted to the frame of the component by way of bearings at its ends for rotation about its longitudinal axis. The hub portion 102 may be in communication with a motor to effectuate rotation thereof and thus the media elements 104.

In accordance with an aspect, the hub portion 102 can include a plurality of media securement members 126 disposed on the exterior surface thereof. The media securement members 126 may be welded to the outside surface of the hub portion 102. In accordance with one aspect shown in FIG. 7, the media securement members 126 are key holes that are secured to the hub portion in a non-linear or arcuate shape to impart that same configuration to the media elements 104 when they are attached thereto. The key hole securement members allow individual media elements 104 to be attached to the hub portion 102, removed, and then replaced independently of other packs of media elements. This significantly increases the speed of replacement of the media elements, especially when certain wash elements exhibit more wear than others, and only selective replacement of media elements 104 is deemed appropriate. This provided advantages in terms of time and expense as well as cost.

Figure 8:
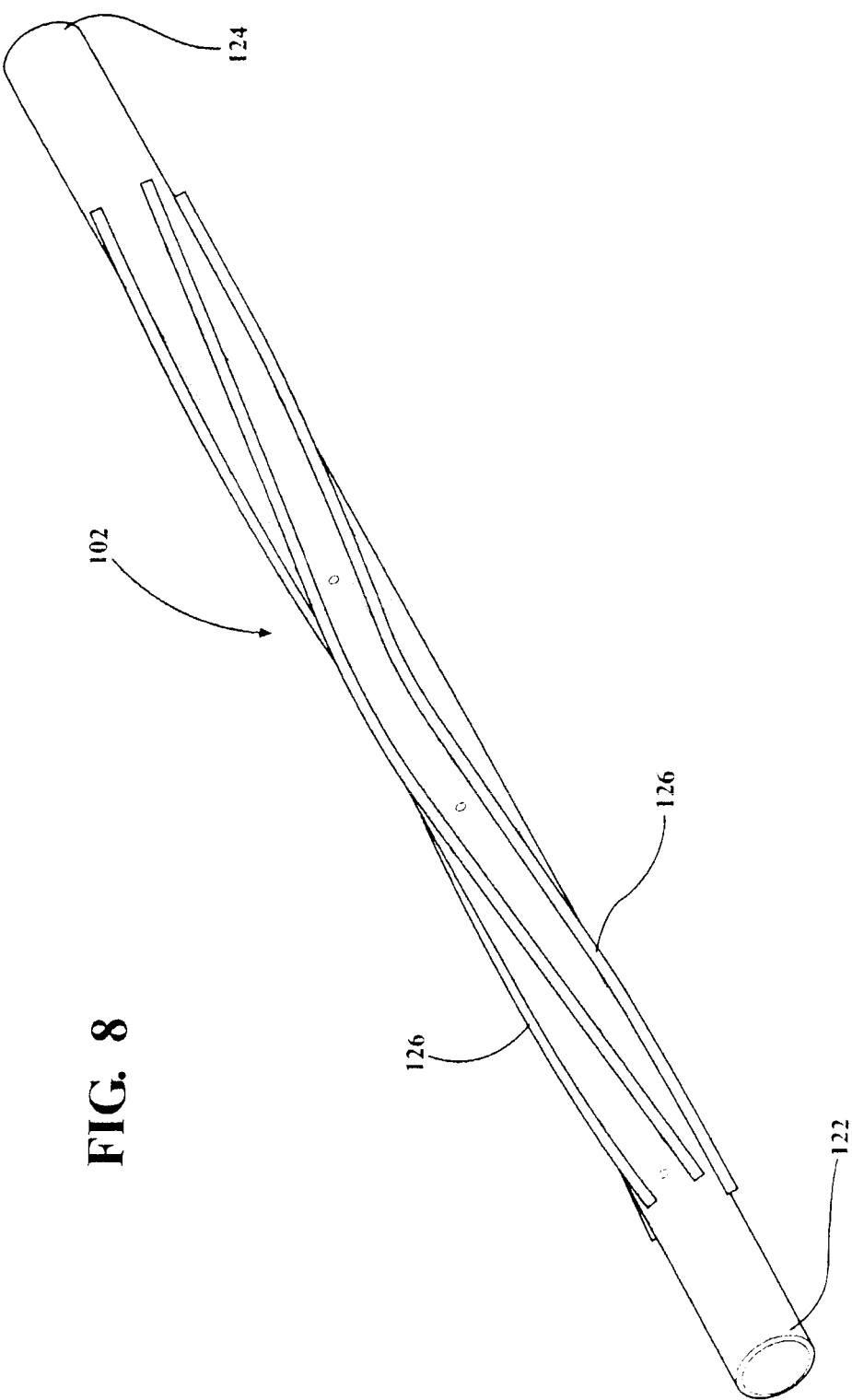
FIG. 8 is a perspective view of a hub portion in accordance with an aspect of the present disclosure.

FIG. 8 illustrates a hub portion 102 in accordance with another aspect of the disclosure. In accordance with this aspect, the media securement members 126 consist of channels that are secured to the exterior surface of the hub portion 102, such as though welding. The members 126 provide channels that receive and hold a retention member 128 of the media elements 104. As shown, the media securement members 126 are secured to the hub portion 102 in a non-linear or arcuate path again so the media elements 104 when attached have a similar path. In accordance with an aspect, the media securement members 126 are spaced at about 72 degree intervals so that there are a total of five such members 126 equally spaced around the outside circumference of the hub portion 102.

With reference again to FIG. 7, the media elements 104 include retention members 128 that extend from the first ends 106 of the media elements 104 for engagement with the media securement members 126. As shown, in accordance with this aspect, the retention members 128 are secured to the first ends 106 of the media elements 104 to form a welt such that the media elements 104 can be attached to the hub portion 102 by coupling them to the media securement members 126. In accordance with an aspect, the media elements 104 are self-erecting or self-supporting such that they extend generally perpendicularly away from the hub portion 102 along their length.

Figure 9:
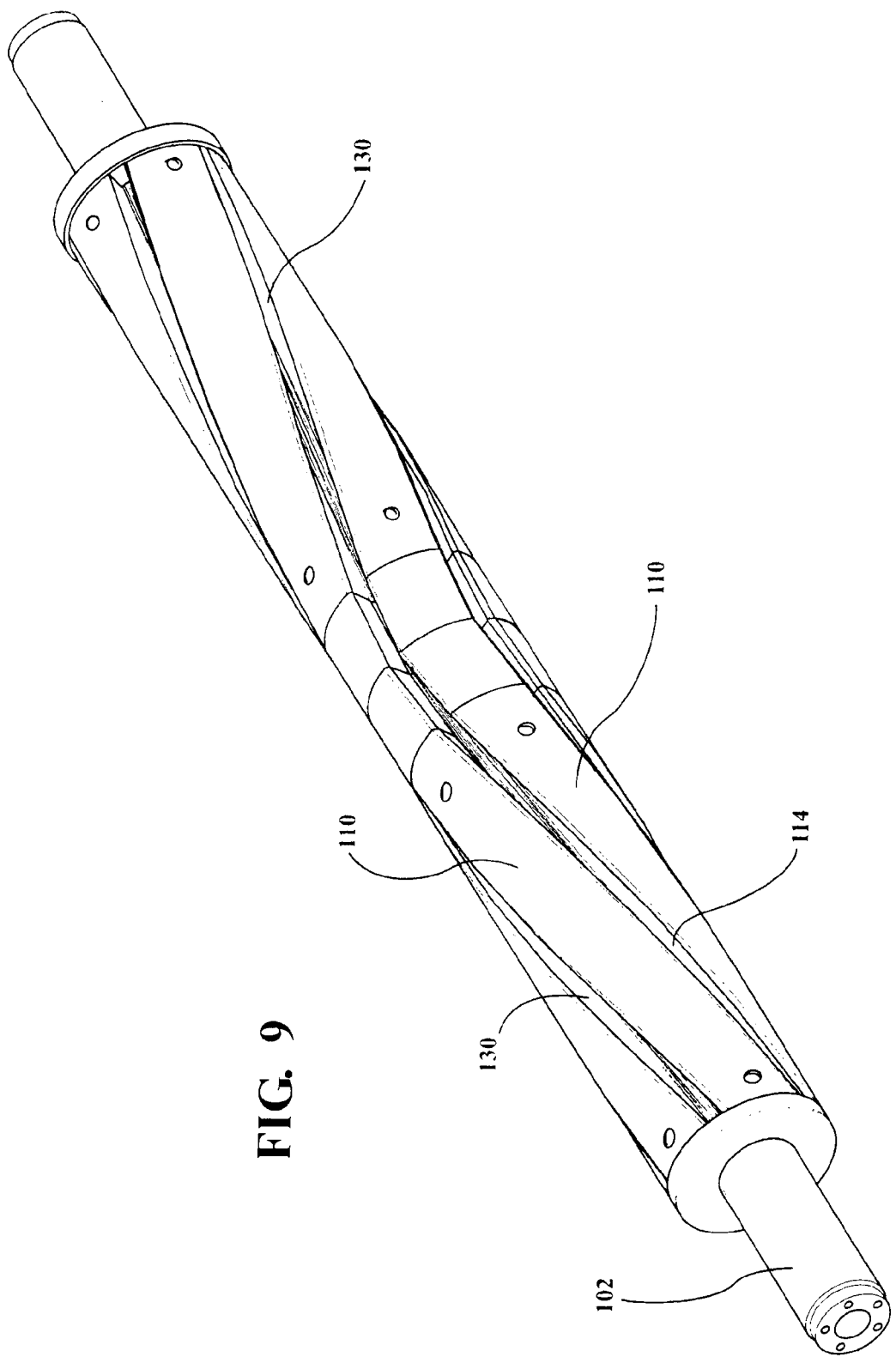
FIG. 9 is a perspective view of a hub portion with a plurality of attached lens portions in accordance with an aspect of the present disclosure.
Figure 10:
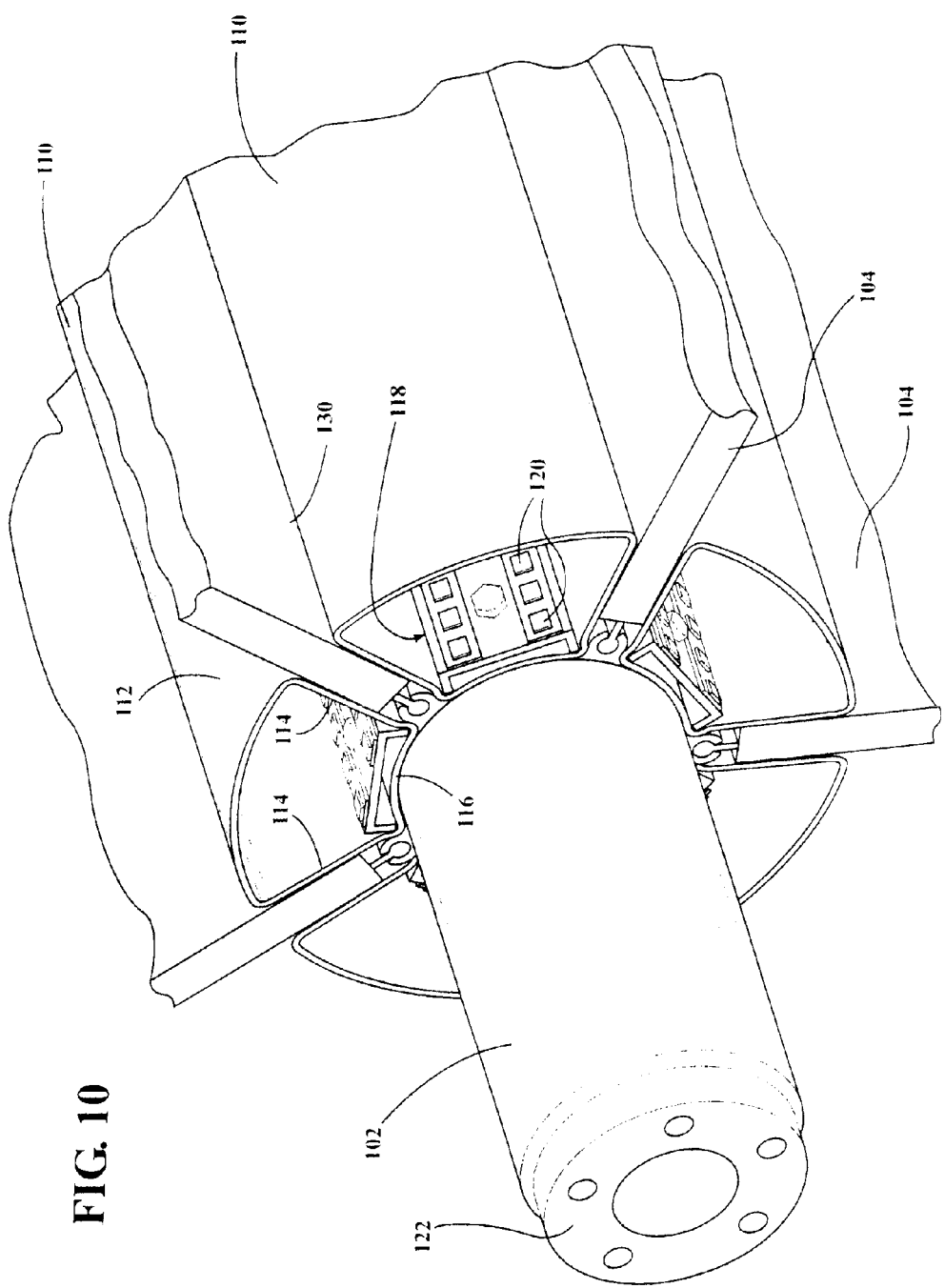
FIG. 10 is a partial perspective view of a hub portion in accordance with an aspect of the present disclosure.
Figure 10B:
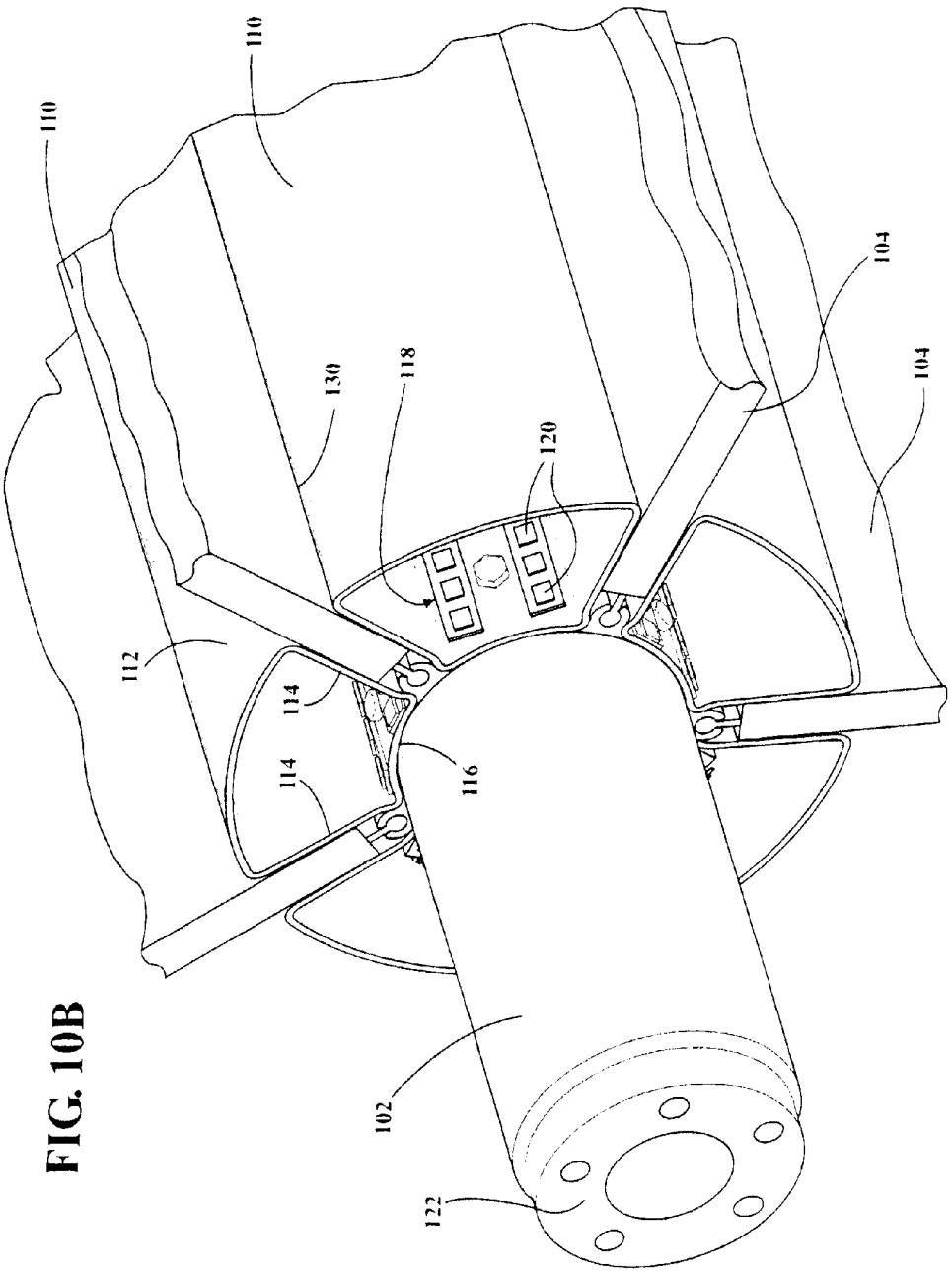
FIG. 10b is a partial perspective view of a hub portion in accordance with another aspect of the present disclosure.

According to still another aspect, as shown in FIGS. 9, 10 and 10b, the lens portions 110 are secured to the hub portion 102 so that the sidewalls 114 closely abut the media securement members 126 so as to provide radial slots 130 for the media elements 104, thereby stabilizing the elements when they are properly installed. The radial slots 130 provide support to a portion of media elements 104 through the sidewalls 114. This prevents the media elements from rotating or flexing and provides effective rigidity thereto. They also assist in preventing excessive flopping of the media elements during rotation of the brush. The lens portions 110 may be molded to follow a non-linear or arcuate path of the media securement members 126. It will be appreciated that the lens portions 110 and media securement members 126 can have a variety of different shapes and designs.

According to an aspect, the media elements 104 are substantially self-supporting and maintain their effective working length regardless of the rotational speed of the brush. Because the media elements or stalks are self-supporting, they exert a consistent pressure on the vehicle surface, and make contact at more or less predetermined locations, regardless of the brush's rotational speed. The media elements 104 may be designed with a desired "spring pressure" by means of material selection, length, thickness, shaped and depth of cut from the distal to proximal ends as discussed in more detail herein. The spring pressure will be appreciated as the quality of the media elements to fight a vehicle and prevent it from penetrating too far into the working space of the brush. This keeps the hub portion an effective distance from the vehicle exterior.

According to an aspect, the media elements only include a small degree of droop or hang. This translates into the fact that it is unnecessary to rotate the brush assembly at high angular rotational speeds to maintain the overall effective diameter of the brush and to accomplish the washing function. The further result is a quieter, more thorough, and energy-efficient wash function. The lower rotational speeds also are likely to minimize any damage to the paint or vehicle appendages as compared to prior art devices which involve the rotation of brush implements at high speeds.

Figure 11B:
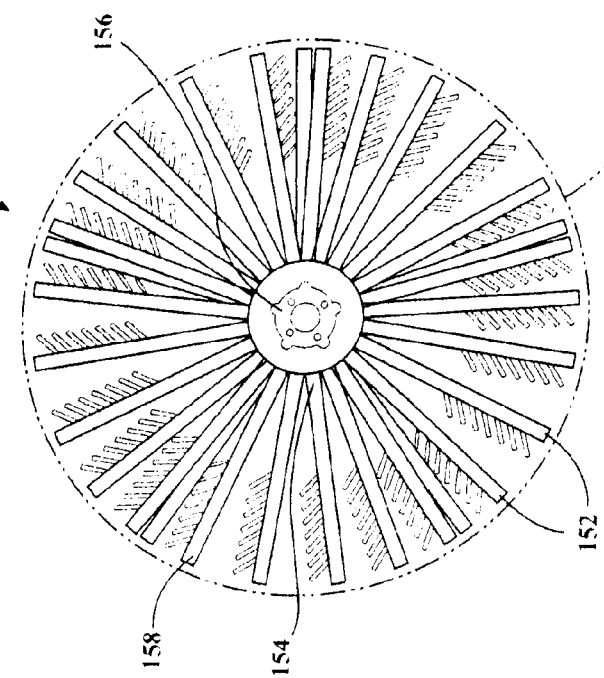
FIG. 11b is a top view of the brush assembly of FIG. 11a at rest.
Figure 11A:
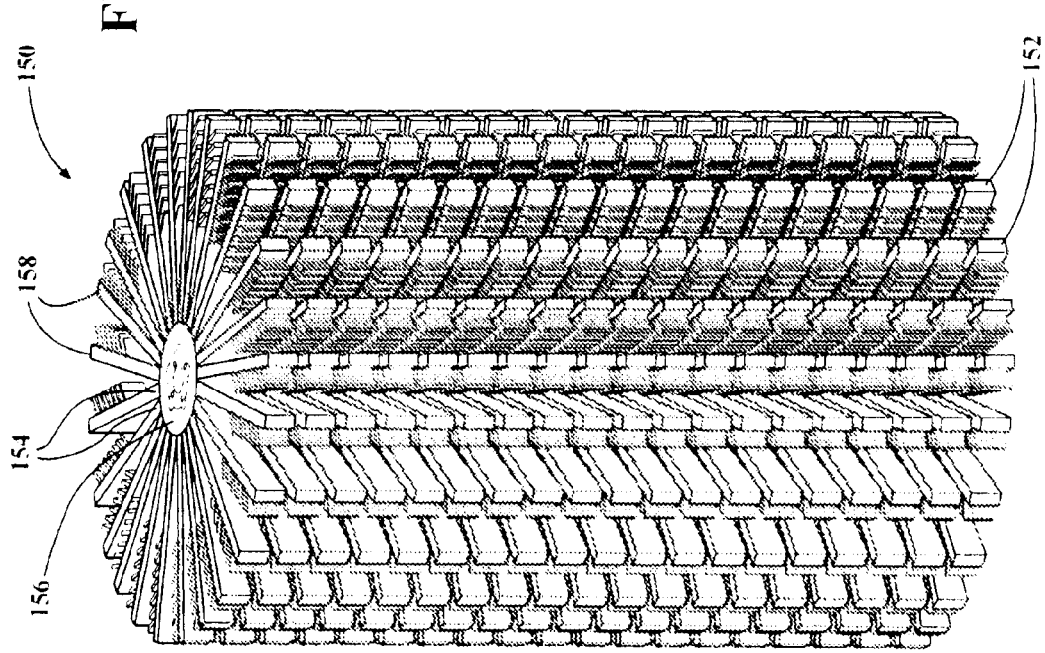
FIG. 11a is a perspective view of a brush assembly for a vehicle wash component at rest in accordance with an aspect of the present disclosure.
Figure 12B:
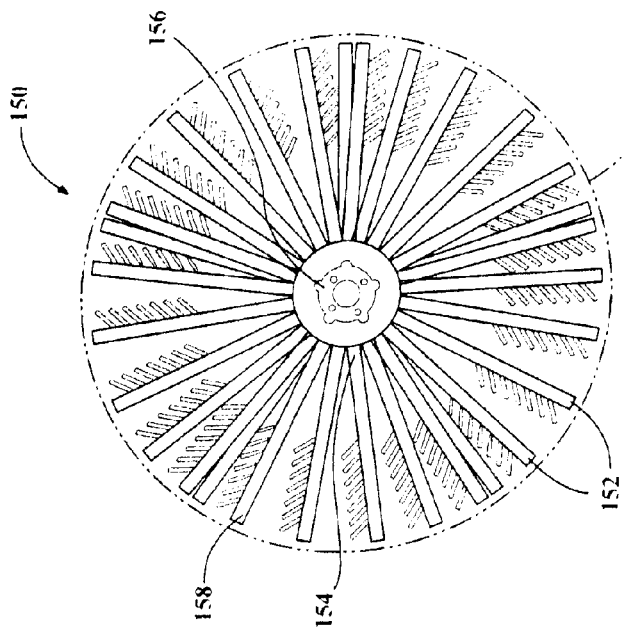
FIG. 12b is a top view of the vehicle wash component of FIG. 12a rotating at low RPMs.
Figure 12A:
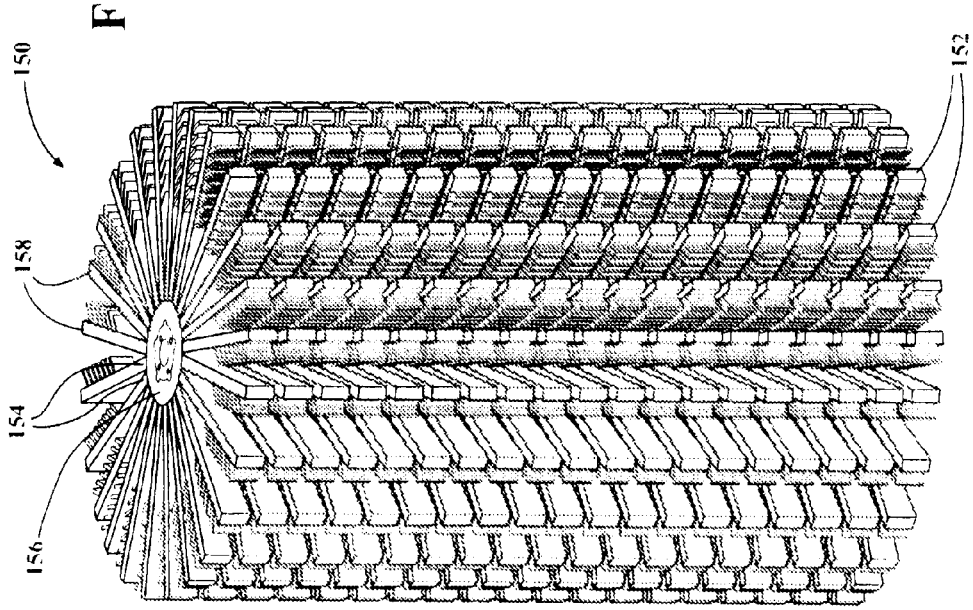
FIG. 12a is a perspective view of a vehicle wash component rotating at low RPMs in accordance with an aspect of the present disclosure.

Referring now to FIGS. 11a, 11b, 12a, and 12b which illustrate a brush assembly 150 in accordance with an aspect of the present disclosure. FIGS. 11a and 11b illustrate the brush assembly 150 at rest and FIGS. 12a and 12b illustrate the brush assembly 150 rotating at low RPMs. According to an aspect, low RPMs may be less than 50 RPMs. With reference to FIGS. 11a, 11b, 12a, and 12b, the media elements 152 are self-supporting from a first end 154 connected to a hub portion 156 to a second end 158 located away from the hub portion 156. As shown, the media elements 152 may extend from the hub portion 156 such that they are substantially perpendicular thereto over a considerable portion of their lengths (l). This is in contrast to existing media elements employed with prior vehicle wash components where the media elements are not self-supporting and have significant droop, which causes them to hang while at rest, as generally illustrated in FIGS. 1a and 1b. It will be appreciated that the media elements 152 need not be entirely perpendicular along their lengths as they may have some degree of droop in accordance with the present disclosure.

As shown in FIGS. 11a and 11b, according to an aspect of the present disclosure, when the brush assembly 150 is at rest, it defines a resting footprint, generally designated by reference number 160, which is defined by the second ends 158 of the media elements 152. The resting footprint 160 is substantially larger than the resting footprint ($F_1$) of current vehicle wash components, as shown in FIGS. 1a and 1b.

FIGS. 12a and 12b illustrates the brush assembly 150 according to an aspect while rotating. When the brush assembly 150 is rotating, a rotating footprint 162 is created that is defined by the second ends 158 of the media elements 152. Because the media elements 152 are self-supporting, the resting footprint 160 and the rotating footprint 162 are substantially the same regardless of the rotational speed of the brush assembly 150. This allows the rotational speed of the brush assembly 150 to be varied without significantly altering the working footprint. Consequently, unlike prior vehicle wash components where a high rotational RPM is required to achieve the necessary footprint to make contact with a vehicle exterior, the present disclosure allows this working footprint to be achieved at significantly reduced RPMs, which provides numerous advantages as enumerated herein. It will be understood that while the present disclosure contemplates rotating the brush assembly 150 at a low RPMs, benefits over the prior art can still be achieved while rotating the brush assembly at high RPMs.

Figure 13:
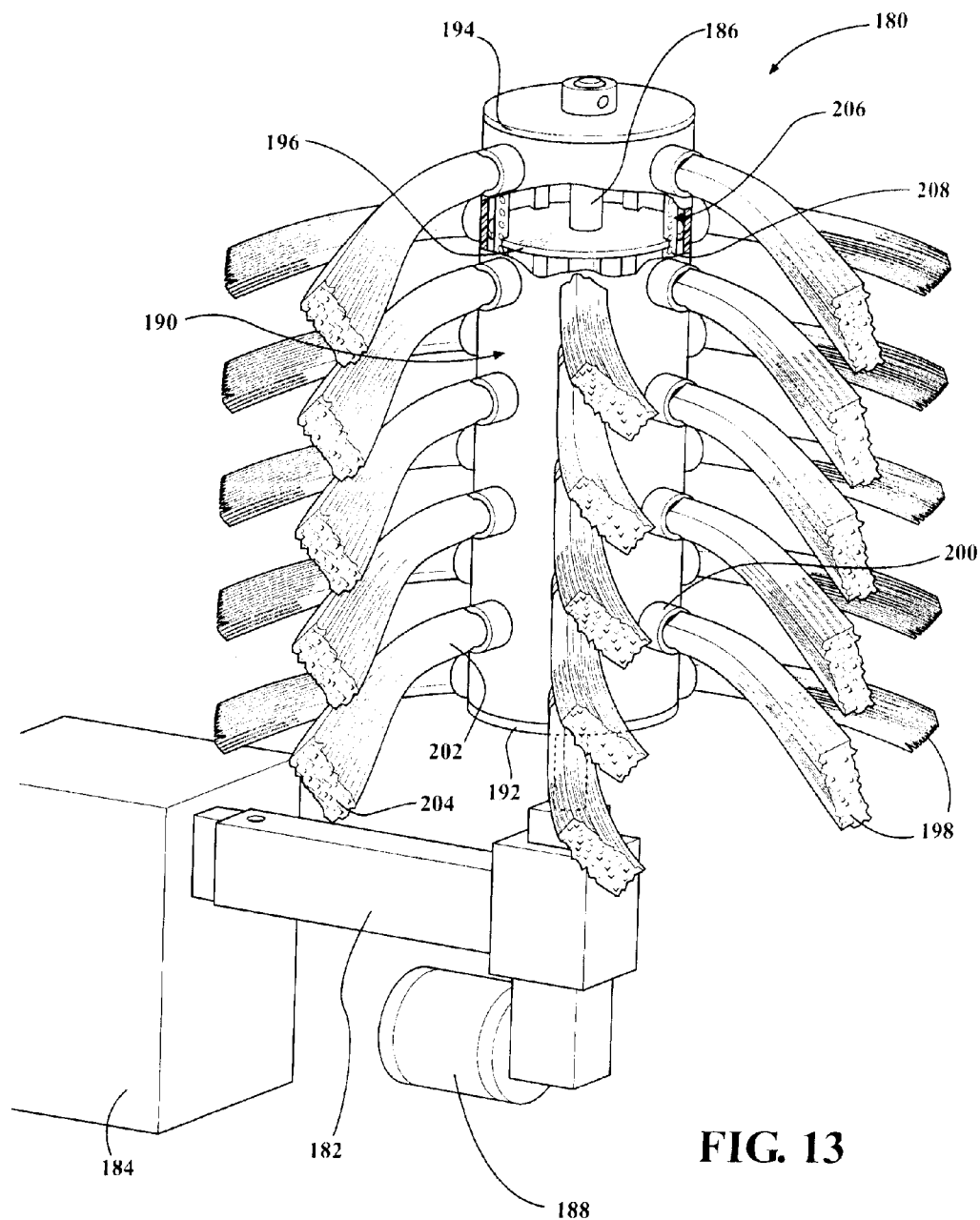
FIG. 13 is a perspective view of a vehicle wash component in accordance with another aspect of the present disclosure.

FIG. 13 is a perspective view of a vehicle wash component in accordance with another aspect of the disclosure. As shown, the vehicle wash component is a side brush 180 that is mounted for rotation about a substantially vertical axis for the purpose of washing by contact the exterior surface of a vehicle passing along a conveyer lane. The side brush 180 is mounted to a swing arm 182 which is connected to a floor mount 184 in such a way as to permit the swing arm 182 and the brush 180 to swing in and out relative to the side surface of the vehicle. This allows the brush 180 to accommodate vehicles of different sizes and also to help prevent any damage to the components of the side brush 180 by contact with a vehicle. Conventional hydraulic/pneumatic cylinders, springs, and/or counterweights may be used for the purpose of controlling the position of the side brush 180 relative to the wash lane, as will be apparent to persons skilled in the art.

According to an aspect, the side brush 180 comprises a shaft 186 which is connected to be driven by a motor 188. The shaft 186 extends upwardly through the center of a cylindrical hub portion 190 which is made primarily of a polymeric material such as high-density polyethylene. The hub portion 190 may also be transparent or translucent. The hub portion 190 can have end caps 192, 194 connected by suitable means to the hub portion 190 as well as one or more interior bulkheads 196 to provide rigidity to the structure and stabilize the hub portion 190 on the shaft 186. The motor 188 may be equipped with a speed-reducing gearbox as required. Alternatively, the motor may be a hydraulic motor.

According to an aspect, the hub portion 190 may include a plurality of spaced-apart self-erecting, foam media elements 198 extending therefrom, as discussed in more detail below. In this aspect, the media elements 198 are connected to the hub portion 190 by cylindrical collars 200 and are arranged in staggered circumferential rows with a space between adjacent media elements 198 both vertically and circumferentially. This spacing allows the hub portion 190 to be seen between the rows of media elements 198. The diameter of the hub portion 190 and the length of the media elements 198 from a first end 202 to a second end 204 can vary. The vertical dimension of the brush 180 can also vary according to the application. According to an aspect, the media elements 198 can be secured to the hub portion 190 at an angle to assist in minimizing the impact of the media elements with a vehicle exterior and the resulting noise. In accordance with an aspect, the media elements 198 are oriented at approximately a 45 degree angle with respect to ground. It will be appreciated that the media elements may be secured to the hub portion 190 at different angles.

Additionally, as shown, the side brush 180 can include a plurality of light strips 206 disposed thereon. The light strips 206 may each carry a plurality of individual LEDs 208 and may be located on the interior surface of the hub portion 190 to illuminate the hub portion 190 in various ways. The hub portion 190 may be translucent, such that it can serve as a lens to disperse light from the light strips 206 for viewing by a customer within a vehicle to provide an aesthetically pleasing appearance. Alternatively, the hub portion can be opaque and the collars can be translucent so that they emit light. It will be appreciated that the LEDs 208 may be illuminated to provide a constant single color light or only when the brush 180 is rotating. Alternatively, the LEDs may emit different colors at different times either purely for variety, to convey information regarding the progress of the wash process, or for branding purposes. Similarly, the LEDs 208 on the light strips 206 may be caused to blink either for purely aesthetic or for utilitarian purposes. The LEDs may be easily changed to modify the colors for different purposes. It will be understood that other illumination elements besides LEDs may be employed. Also, the location of the LEDs with the respect to the hub portion 190 may vary as required.

FIGS. 14 through 20 illustrate media elements for use with vehicle wash components in accordance with various aspects of the present disclosure. FIG. 14 is an exploded view of a media element 230 in accordance with an aspect of the disclosure and illustrates one of the media elements that is configured to be secured to a hub of a vehicle wash component. It will be appreciated that all of the media elements on a vehicle wash component can be the same. Alternatively, they may have varying configurations, lengths or orientations as needed. As shown, the media element 230 is an elongate structure that may be constructed of an EVA foam as is discussed on more detail in Applicant's co-pending patent application Ser. No. 13/668,029, entitled "An Improved Media Element for A Vehicle Wash Component", filed concurrently herewith, the disclosure of which is hereby incorporated by reference as though set forth fully herein. The media elements may alternatively be constructed of other suitable materials.

As discussed below, the media element 230 may be constructed of two separate portions that are adhesively bonded together with a cord or bead welt at one end for mounting in a media securement member. The media element may be utilized in a brush in a tunnel vehicle wash facility. Alternatively, the media element may be employed in a brush for a rollover vehicle wash where the rotation direction of the brush reverses with each pass of the rollover gantry over the vehicle being washed.

According to an aspect, the media element 230 can include a top ply portion 232 and a bottom ply portion 234 that are minor images of one another. Each ply portion 232, 234 has an inner surface 236 and an outer surface 238. The outer surface of each ply portion 232, 234 may include two elongated slots 242 which divide each of the ply portions into elongate parallel fingers 240A, 240B, and 240C. It will be appreciated that the lengths of the slots 242 and the number of slots 242 and therefore elongated fingers 240A, 240B, 240C can vary. Also, the slots 242 do not need to be configured to form parallel fingers as they may take on different configurations.

Additionally, the elongated fingers 240A, 240B, and 240C of the top ply portion 232 are provided with crosswise slots 244 to receive one or more treatment heads 246, which in accordance with an aspect are made of foam plastic, synthetic felt or other suitable material with some shape-retaining quality. A cord 248 may be placed between the ply portions at the inner ends 250 of the media elements 230 to provide a securing structure which is configured to mate with a corresponding securement member in the hub portion. The cord 248 may be trapped between the layers of fabric which are folded back on themselves, and then sewn together. The resulting article may then be adhesively secured between the ply portions of the media elements, as shown. According to an aspect, the media element may be formed as a single structure. It could alternatively include more or less ply portions.

According to an aspect, the inner surface 236 of the ply portions 232, 234 may include groves 254 along the lengths of each of the fingers 240A, 240B, and 240C. These grooves may be slightly shorter than the elongated slots 242 that separate the fingers 240A, 240B, 240C. The purpose of the shallow grooves 254 is to provide a recess for receiving the tabs 256 of the treatment heads 246 that pass through the crosswise slots 244 to secure the treatment head 246 to the body portion 232, 234. An exemplary treatment head 246 is illustrated in FIG. 15. According to an aspect, the tabs 256 are bent over when the ply portions 232, 234 are brought together and adhesively bonded to one another to form the final media element 230. The treatment heads 246 may also include one or more longitudinal cuts 260 formed therein, which create a plurality of elongated contact portions 262. The elongated contact portions 262 may flex and move independently with respect to one another. According to another aspect, the treatment heads 246 may be angled toward the outer end 258 of the media element 230. It will be appreciated that each finger 240A, 240B, 240C can receive a plurality of treatment heads 246. While four treatment heads 246 are illustrated in FIG. 14, it will be appreciated that more or less treatment heads 246 may be employed. The configuration of the treatment heads 246 as well as their attachment locations can vary. Additionally, the treatment heads 246 may be an integrally formed structure as opposed to a separately attached structure.

According to an aspect, the media elements 230 may utilize a hybrid configuration employing multiple materials to provide an improved washing action and cleaning results. As shown, the wash elements can include a self-supporting body portion that is formed of a light material, which does not absorb water so to remain light during the wash process. Attached to the outer end 258 of the media element 230 is a treatment head 246 that is formed of a textile-based material and is configured to contact a vehicle surface. This textile based treatment head 246 can retain water and detergents and provide a superior washing action, without the heaviness or noise associated with existing wash media elements that are made entirely of a textile-based material.

Figure 16:
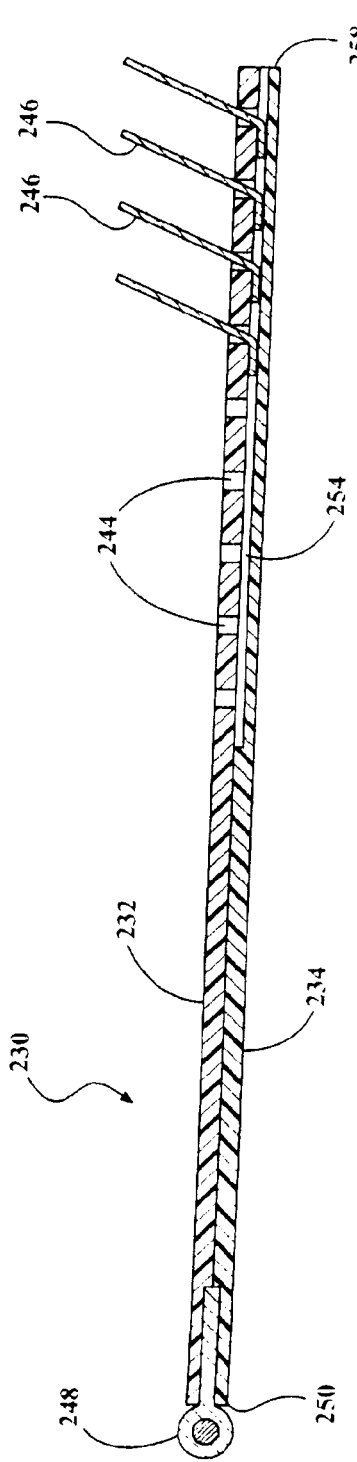
FIG. 16 is a top view of the media element of FIG. 14.
Figure 17:
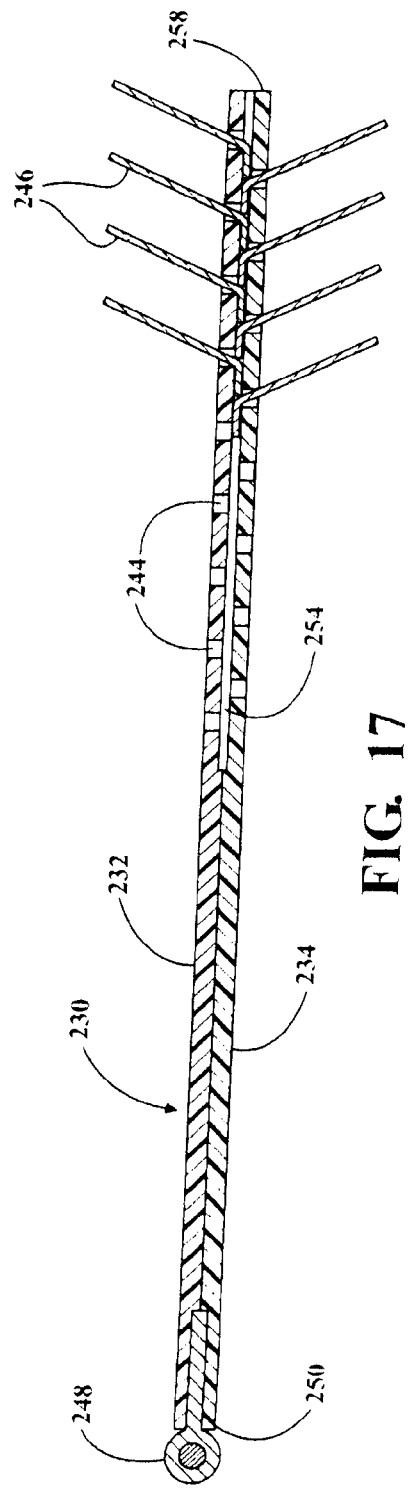
FIG. 17 is a top view of a media element for a vehicle wash component in accordance with another aspect of the disclosure.

As shown in FIG. 16, in accordance with one aspect, the treatment heads 246 protrude outwardly from only the top ply portion 232 (or only the bottom ply portion 234). FIG. 17 illustrates another aspect where the treatment heads 246 protrude outwardly from both the top ply portion 232 and the bottom ply portion 234. The treatment heads 246 on both sides are preferably identical, however they could have different configurations as required.

Figure 18:
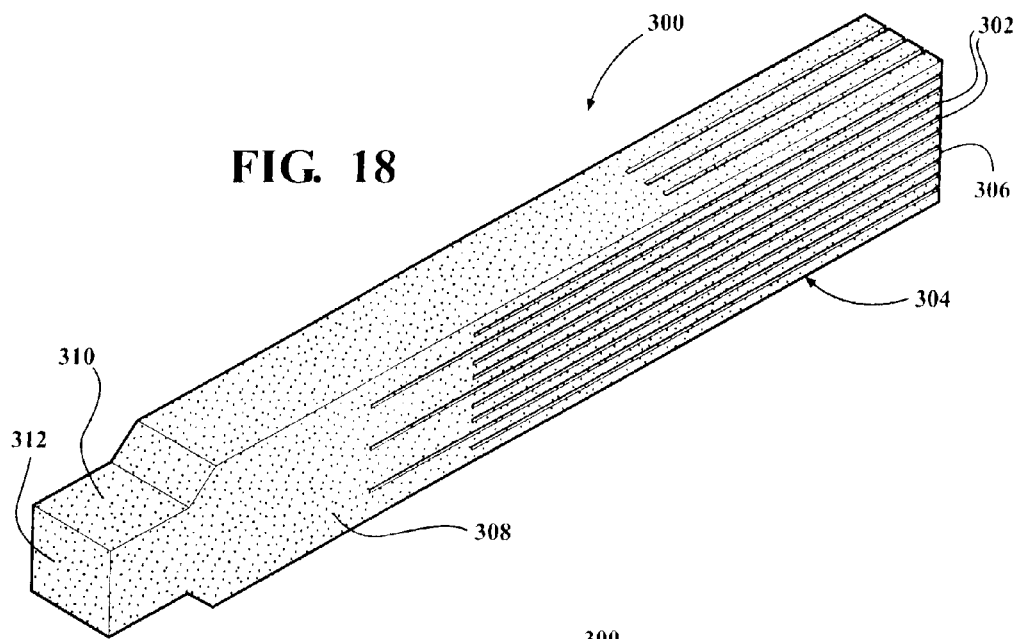
FIG. 18 is a perspective view of a media element for a vehicle wash component in accordance with another aspect of the present disclosure.
Figure 19:
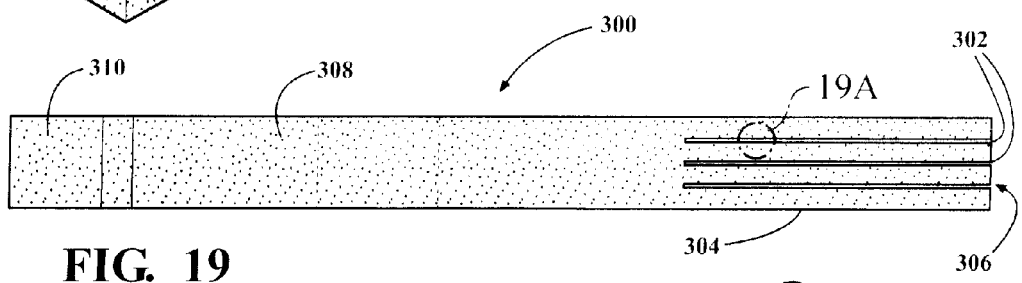
FIG. 19 is a top view of the media element of FIG. 18.
Figure 19A:
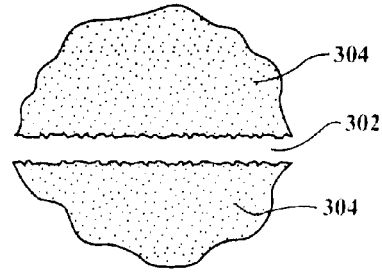
FIG. 19a is an enlarged sectional view of the media element of FIG. 19.
Figure 20:
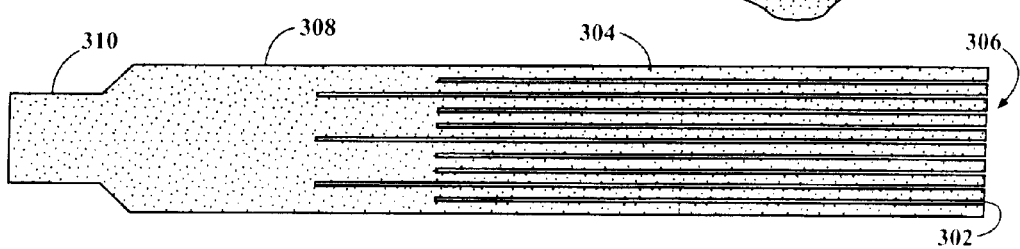
FIG. 20 is a side view of the media element of FIG. 18.

FIGS. 18 through 20 illustrate a media element 300 in accordance with another aspect of the present disclosure. According to this aspect, the media element 300 may be manufactured from a single block of closed cell EVA, and may include a plurality of saw cuts 302 to provide a splayable section comprising treatment heads 304 at an outer end 306 of the media element 300. The saw cuts 302 are formed in both a longitudinal and radial direction. The result of employing a plurality of saw cuts into the media element 300 and creating a plurality of treatment heads 304 is to permit the treatment heads 304 to fan out in contact with the surface of the vehicle being washed and increase the effective area of contact. It will be appreciated to those skilled in the art that instead of saw cutting a solid block of closed-cell EVA foam, a media element of similar physical characteristics to those shown in FIGS. 14 through 17 may be constructed by laminating and adhesively bonding (or heat bonding) individual layers of pre-cut material. In addition, combinations of cutting and laminating can also be used.

The media element 300 also includes a spring section 308, which is generally disposed in the middle portion, and a reduced-size section 310 at the inner end 312, which can be mounted by collars into the hub portion of the brush, as discussed above. Alternatively, the inner end 312 of the media element 300 may be configured to mate with a securement member on the hub portion. The spring section is intended to help maintain the extended shape of the media element 300 and the inner end 312 to facilitate trapping the media element 300 in the media securement members mounted to the hub portion. The spring section also helps provide the media element with the desired effective rigidity as discussed above. The spring section may be located in various places along the body of the media element.

The EVA material from which the media element 300 is formed is preferably between about 4-10 pounds per cubic foot in density and the surfaces for the treatment heads 304 in the outer end 306 may be textured by the use of a saw blade with alternatively oppositely oriented blade teeth. The textured surface, which is schematically illustrated in FIG. 17, can give the cleaning heads 306 a feel similar to terrycloth.

The multi-segment media elements with discrete treatment heads can be angled, whether through design or use or both, to clean differing vehicle contours. This enables a vehicle wash component as described herein to effectively clean or treat differing vehicle contours, while employing media elements of consistent length, and maintaining a consistent surface speed along the length of the brush. This ensures that the entire brush cleans the vehicle surface with the desired action, and reduces both the potential for vehicle damage and the unpleasant noise levels experienced by vehicle occupants.

According to an aspect, the resulting media elements are self-erecting in the sense that they tend to stand outwardly from the hub portion even when it is not being rotated by the motor. Only a small degree of droop is evident. These elements stand unsupported. This translates into the fact that it is unnecessary to rotate the brush at high angular rotational speeds to maintain the overall effective diameter of the brush and to accomplish the washing function. The further result is a quieter, more thorough and energy-efficient wash function. The lower rotational speeds also are less likely to damage paint or vehicle appendages than some prior art devices which involve the rotation of brush elements at high speeds. The density of the foam material used to make the media elements is such that they stand fully out radially from the hub portion even when the brush is not rotating.

The overall result is an attractive, quiet running, effective brush with a long life and a high tech look. The quiet operation is due in part to the use of the foam EVA material and in part to the reversing arcuate configuration of the media tracks between the lenses on the aluminum hub. This curving media track results in a progressive or time-shaped series of contacts between individual media elements and treatment head combinations as the brush rotates as opposed to a brush with straight cleaning elements where all of the cleaning elements in a given line along the length of the brush contact the vehicle at the same time during brush rotation.

In operation, the brush is actuated and brought into position adjacent a wash lane when a vehicle approaches. In a typical operation, a vehicle is first sprayed with a soapy foam from outlets in an arch and then brought into contact with the brushes which perform a smooth, quiet, massaging action on the vehicle, the textured splayable treatment heads and fingers having an effect much like a terrycloth towel to provide a through but quiet and energy conserving cleaning action. It has been found that the cleaning elements and fingers tend to trap dirt and, even though the brushes are rotated at a very low speed, there is some action tending to flick or discharge dirt particles rearwardly away from the vehicle such that a cleaner set of media elements is then brought back into contact with the vehicle by continued rotation. Abundant water is applied to the vehicle during and immediately after the washing function by suitable spray devices as will be apparent to persons skilled in the art.

In accordance with another aspect, a mechanical contact device may be disposed adjacent each of the rotating brushes. The brushes may be brought into contact with the mechanical contact device while it is rotating to assist in cleaning the media elements. This eliminates the need to rely solely on centrifugal force or the use of water rinsing the clean the brush.

By way of reiteration, it will be appreciated that there are a number of significant advantages emerging from the subject matter described herein, including: (1) a car wash implement of unique albeit variable appearance; (2) a quiet, low energy operation resulting from the self-erecting quality of the media elements and the capability of rotating the brush at low speeds; (3) a dramatic reduction in the water and dirt slinging effect, (4) a soft massage-type cleaning action, (5) a capacity for providing an illuminated core structure for both aesthetic and/or utilitarian purposes. Additionally, the foam media elements provide resistance against the vehicle that limits the degree to which the vehicle penetrates the brush and keeps the hub portion a safe distance from the vehicle.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A component for a vehicle wash system, comprising:
    a rotatable hub portion having an outer surface and an axis of rotation;
    a plurality of media elements secured to said hub portion;
    at least one translucent portion disposed on said outer surface of said hub portion between adjacent media elements;
    at least one illumination element for illuminating said at least one translucent portion such that said illuminated translucent portion is configured to be seen while said hub portion rotates.

2. The component of claim 1, wherein said plurality of media elements are constructed of a flexible, self-supporting material such that they substantially retain their shape when said hub portion rotates at low RPMs.

3. The component of claim 2, wherein said plurality of media elements have a length that is at least two times greater than a height and where said plurality of media elements extend in a direction substantially perpendicular to said hub portion along said length when said hub portion is at rest.

4. The component of claim 2, wherein said hub portion is moveable from a resting position wherein said plurality of media elements define a resting footprint of the component to a rotating position wherein said plurality of media elements define a rotating footprint; and
    wherein said resting footprint and said rotating footprint are substantially the same.

5. The component of claim 1, wherein said plurality of media elements include an attachment mechanism disposed adjacent a first end to secure said plurality of media elements to said hub portion.

6. The component of claim 5, wherein said attachment mechanism includes a keyhole configuration.

7. The component of claim 1, wherein each of said plurality of media elements include a treatment head disposed adjacent a second end thereof.

8. The component of claim 7, wherein said treatment head includes a plurality of contact elements.

9. The component of claim 8, wherein said plurality of contact elements consist of a plurality of finger elements.

10. The component of claim 9, wherein said plurality of fingers are integrally formed in said second ends of said plurality of media elements.

11. The component of claim 7, wherein said treatment head is disposed at an angle with respect to a body portion of said plurality of media elements.

12. The component of claim 11 wherein said treatment head is a separate component that is secured to said body portion of said plurality of media elements.

13. The component of claim 12, wherein said treatment head is a separate component that is secured to each of said plurality of media elements.

14. The component of claim 13, wherein said treatment head is formed of a different material than said plurality of media elements.

15. The component of claim 1, further comprising:
a plurality of translucent portions disposed around a majority of said outer surface of said hub portion.

16. The component of claim 15, further comprising:
a plurality of illumination elements disposed between said outer surface of said hub portion and a respective one of said plurality of translucent portions.

17. The component of claim 16, wherein said plurality of illumination elements emit different colors.

18. The component of claim 15, wherein said plurality of media elements are secured to said hub portion in a plurality of discrete rows or columns and wherein each of said plurality of discrete rows or columns are spaced apart from one another such that one of said plurality of translucent portions is visible between adjacent rows.

19. The component of claim 18, wherein said plurality of media elements in each row of said plurality of rows or columns extend from an exterior surface of said hub portion in a generally arcuate configuration beginning at a first side of said hub portion and extending toward a second side of said hub portion.

20. The component of claim 1, wherein said at least one translucent portion is a lens.

21. The component of claim 1, wherein said illumination element is disposed between said outer surface of said hub portion and said at least one translucent portion to illuminate said at least one translucent portion while said hub portion rotates.

22. The component of claim 21, wherein said illumination element consists of at least one light-emitting diode.

23. The component of claim 1, wherein said plurality of media elements are formed from an extruded foam material.

24. The component of claim 1, wherein said plurality of media elements are formed from an injection molded foam material.

25. The component of claim 1, wherein the component is configured as a top wheel, which is intended to contact an upper surface of a vehicle in the vehicle wash system.

26. The component of claim 1, wherein the component is configured as a side brush, which is intended to contact a side surface of a vehicle in the vehicle wash system.

27. A component for a vehicle wash system, comprising:
a rotatable hub portion having an outer surface and an axis of rotation;
a plurality of media elements secured to said hub portion; said plurality of media elements arranged in a plurality of arrays that extend in a direction along said axis of rotation;
said plurality of arrays being spaced apart from one another to create a plurality of open areas between a pair of adjacent arrays of said plurality of arrays;
at least one illumination element for illuminating at least one of said open areas between said plurality of arrays.

28. The component of claim 27, further comprising:
at least one translucent portion disposed on said outer surface of said hub portion between said pair of adjacent arrays of said plurality of spaced apart arrays.

29. The component of claim 28, further comprising:
a plurality of translucent portions disposed in each of said plurality of open areas between said pair of adjacent arrays of said plurality of arrays.

30. The component of claim 29, further comprising:
a plurality of illumination elements disposed between said outer surface of said hub portion and a respective one of said plurality of translucent portions.

31. The component of claim 30, wherein said plurality of illumination elements emit different colors.

32. The component of claim 28, wherein said at least one translucent portion is a lens.

33. The component of claim 28, wherein said illumination element is disposed between said outer surface of said hub portion and said at least one translucent portion to illuminate said at least one translucent portion while said hub portion rotates.

34. The component of claim 33, wherein said illumination element consists of at least one light-emitting diode.

35. A component for a vehicle wash system, comprising:
a rotatable hub portion;
a plurality of media elements secured to said hub portion;
a plurality of illumination elements in communication with said hub portion and configured to rotate with said hub portion;
wherein said illumination elements are configured to emit light that can be seen from a vehicle in a vehicle wash facility while said rotatable hub portion rotates.

* * * * *

UNITED STATES PATENT AND TRADEMARK OFFICE
CERTIFICATE OF CORRECTION

PATENT NO. : 8,819,887 B2  
APPLICATION NO. : 13/668093  
DATED : September 2, 2014  
INVENTOR(S) : Michael J. Belanger et al.

It is certified that error appears in the above-identified patent and that said Letters Patent is hereby corrected as shown below:

In the Specification

Column 10, Line 64, minor images should read – "mirror images".

Signed and Sealed this
Twentieth Day of January, 2015

Michelle K. Lee
*Deputy Director of the United States Patent and Trademark Office*